(12) United States Patent
Andrich et al.

(10) Patent No.: US 12,480,778 B2
(45) Date of Patent: Nov. 25, 2025

(54) PRESENTING TRANSIT ALIGHT NOTIFICATIONS

(71) Applicant: Apple Inc., Cupertino, CA (US)

(72) Inventors: Brian J Andrich, San Francisco, CA (US); Sara E Marcus, Brooklyn, NY (US); Thomas Pajor, Sunnyvale, CA (US); Nick Provenzano, San Francisco, CA (US); Tim A Aerts, San Jose, CA (US); Alex Benevento, Sunbury (AU); Leo Emile Jean Pierre Vallet, Culver City, CA (US); Samantha J Bennett, San Francisco, CA (US); Sara A Bergquist, Sacramento, CA (US); Nathan L Fillhardt, Scotts Valley, CA (US); Yun Jae Kim, San Francisco, CA (US); Scott G Jackson, San Francisco, CA (US); Jan F Sanchez Dudus, Campbell, CA (US); Ishan Bhutani, Sunnyvale, CA (US); Ray R Chen, San Jose, CA (US); Christopher Y Tremblay, San Jose, CA (US)

(73) Assignee: Apple Inc., Cupertino, CA (US)

( * ) Notice: Subject to any disclaimer, the term of this patent is extended or adjusted under 35 U.S.C. 154(b) by 138 days.

(21) Appl. No.: 17/828,902

(22) Filed: May 31, 2022

(65) Prior Publication Data

US 2022/0390242 A1    Dec. 8, 2022

Related U.S. Application Data

(60) Provisional application No. 63/202,314, filed on Jun. 6, 2021.

(51) Int. Cl.
*G01C 21/36* (2006.01)
*G01C 21/34* (2006.01)
(Continued)

(52) U.S. Cl.
CPC ..... *G01C 21/3655* (2013.01); *G01C 21/3407* (2013.01); *G01C 21/3423* (2013.01);
(Continued)

(58) Field of Classification Search
CPC ........... G01C 21/3407; G01C 21/3423; G01C 21/3644; G01C 21/3655; G01C 21/3661; G01C 21/3885; H04M 1/72457
See application file for complete search history.

(56) References Cited

U.S. PATENT DOCUMENTS

| 8,169,342 B1 * | 5/2012 | Barbeau | G01C 21/3423 |
| | | | 340/539.11 |
| 2007/0034107 A1 * | 2/2007 | Barbeau | G01C 21/20 |
| | | | 104/307 |

(Continued)

*Primary Examiner* — Justin R. Blaufeld
(74) *Attorney, Agent, or Firm* — Invoke

(57) ABSTRACT

In some implementations, a computing device can present alight notifications to a user when the user (e.g., user device) is approaching a public transit stop where the user should depart the public transit vehicle the user is currently occupying. For example, a user may use a user device to generate a public transit route that includes a starting location, a sequence of public transit stops, and a destination location. While traversing the transit route, the user may need to exit public transit vehicle (e.g., to reach the destination location, to switch transit lines, etc.). The user device can identify transit stops along the route where the user should exit a transit vehicle and present notifications prompting the user to exit the transit vehicle at the upcoming stop as the user device approaches the identified transit stops.

18 Claims, 20 Drawing Sheets

(51) Int. Cl.
*H04M 1/72457* (2021.01)
*G01C 21/00* (2006.01)
(52) U.S. Cl.
CPC ..... *G01C 21/3644* (2013.01); *G01C 21/3661* (2013.01); *H04M 1/72457* (2021.01); *G01C 21/3885* (2020.08)

(56) References Cited

U.S. PATENT DOCUMENTS

| | | | | |
|---|---|---|---|---|
| 2009/0023456 | A1* | 1/2009 | Seacat | G01C 21/3461 701/469 |
| 2013/0345981 | A1* | 12/2013 | van Os | H04M 1/72427 701/540 |
| 2014/0343850 | A1* | 11/2014 | Faaborg | G08G 1/00 701/537 |
| 2014/0365113 | A1* | 12/2014 | McGavran | G01C 21/3661 701/538 |
| 2016/0216130 | A1* | 7/2016 | Abramson | G01C 21/3423 |
| 2016/0358471 | A1* | 12/2016 | Hajj | G08G 1/123 |
| 2017/0328728 | A1* | 11/2017 | Salowitz | G01C 21/3423 |
| 2018/0283883 | A1* | 10/2018 | Iland | H04W 4/02 |
| 2018/0302743 | A1* | 10/2018 | Bai | H04W 4/023 |
| 2021/0270617 | A1* | 9/2021 | Spielman | G01C 21/3423 |

* cited by examiner

Don't miss your stop. 1404
Your trip passes through a low signal environment.
You may not get a notification before your exit.

1502

1400

PRESENTING TRANSIT ALIGHT NOTIFICATIONS

INCORPORATION BY REFERENCE; DISCLAIMER

The following application is hereby incorporated by reference: application No. 63/202,314 filed on Jun. 6, 2021. The Applicant hereby rescinds any disclaimer of claim scope in the parent application(s) or the prosecution history thereof and advises the USPTO that the claims in this application may be broader than any claim in the parent application(s).

TECHNICAL FIELD

The disclosure generally relates to presenting public transit information to aid users in navigating transit systems.

BACKGROUND

Users in many metropolitan areas utilize public transportation systems (e.g., public transit systems). These public transit systems can often be complicated to navigate efficiently. Modern computing devices can be used to provide public transit information to improve the efficiency at which users may utilize these public transit systems.

SUMMARY

In some implementations, a computing device can provide quick access to nearby transit options. For example, the computing device (e.g., user device) can provide a user interface that allows a user to quickly access nearby transit options. For example, a user can provide input to add a "nearby transit" shortcut to a navigation application's graphical user interface (GUI). When selected, this shortcut (e.g., a link, button, other affordance, etc.) can invoke a graphical user interface that presents public transit options that exist within a threshold distance of the user device operated by the user. The public transit options can be filtered based on various criteria so that the user is presented public transit options that are most readily available and/or accessible to the user.

In some implementations, a computing device can present alight notifications to a user when the user (e.g., user device) is approaching a public transit stop where the user should depart the public transit vehicle the user is currently occupying. For example, a user may use a user device to generate a public transit route that includes a starting location, a sequence of public transit stops, and a destination location. While traversing the transit route, the user may need to exit public transit vehicle (e.g., to reach the destination location, to switch transit lines, etc.). The user device can identify transit stops along the route where the user should exit a transit vehicle and present notifications prompting the user to exit the transit vehicle at the upcoming stop as the user device approaches the identified transit stops.

In some implementations, a computing device can assist a user in selecting a transit line vehicle to make the user's experience travelling on the transit line more efficient and enjoyable. For example, the computing device (e.g., user device) can present a graphical user interface that shows transit line departures for a transit line selected by the user. Each transit line departure can be annotated with an occupancy status indicator that indicates how close the transit vehicle corresponding to the transit line departure is to maximum occupancy so that the user can select a transit line departure that is not at maximum occupancy. Each transit line departure can be annotated with a transit vehicle recommendation that indicates which portion of the transit vehicle the user should occupy so that the user can efficiently navigate to a subsequent transit stop exit or transit connection along the user's transit route.

Particular implementations provide at least the following advantages. For example, the nearby transit features described herein allow a user to view nearby transit options more quickly and efficiently (e.g., transit stations, transit line departures, etc.) with a single input without having to provide additional input to specify a transit route, specific transit stations, and/or transit lines to present on the display of the user device. The transit alight notifications that warn or remind the user about an upcoming transit vehicle exit can help the user more efficiently traverse transit systems, as forgetting to exit a transit vehicle at an appropriate transit stop can add minutes or hours to a transit trip. The presentation of vehicle occupancy status information for transit line departures (e.g., transit vehicles) can allow the user to plan and traverse a transit route more efficiently by allowing the user to avoid transit lines and/or transit departures that may be overcrowded. The presentation of vehicle section recommendations for boarding transit vehicles can allow the user to move along a transit route more quickly by presenting suggestions as to which sections of a transit vehicle to board to quickly move from the transit vehicle to another transit vehicle or transit station exit at a subsequent transit stop. Each of these features can aid the user in quickly and efficiently navigating a transit route.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
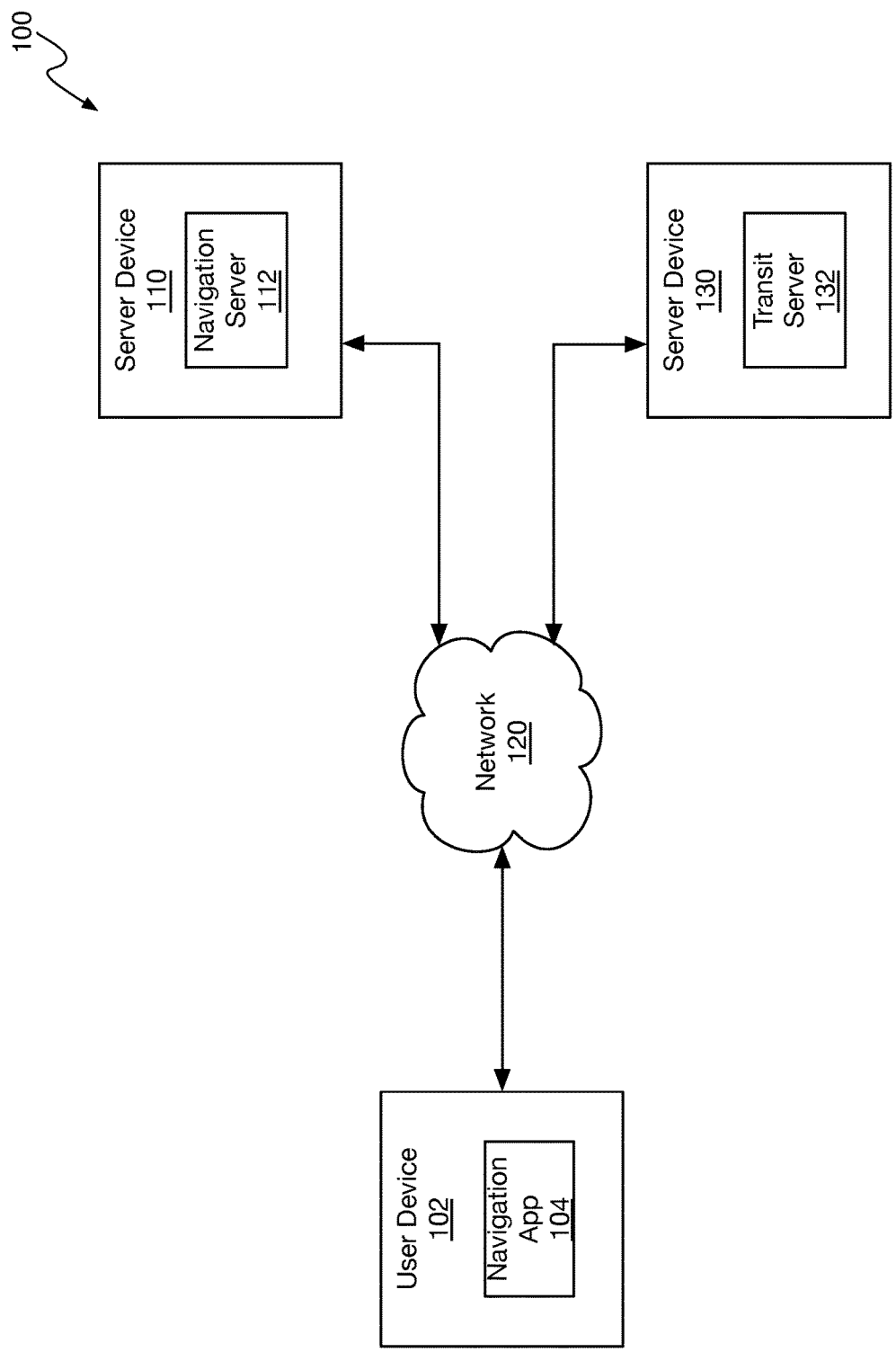
FIG. 1 is a block diagram of an example system for providing transit navigation features on a user device.

FIG. 1 is a block diagram of an example system 100 for providing transit navigation features on a user device. For example, system 100 can provide quick access to nearby transit options, presenting navigation instructions, presenting transit alight notifications, and improving user transit vehicle selections, as described herein.

In some implementations, system 100 can include user device 102. For example, user device 102 can be a computing device, such as a laptop computer, desktop computer, smart phone, smart watch, smart glasses, in car system or other computing device.

User device 102 can include navigation application 104. For example, navigation application 104 can be a software application installed and/or running on user device 102 that generates and/or presents user interfaces and performs other processing to support the transit navigation features described herein.

In some implementations, system 100 can include server device 110. For example, server device 110 can be a computing device configured to provide information to user device 102 to support the transit navigation features presented by user device 102. Server device 110 can, for example, include navigation server 112. Navigation server 112 can be a software process that interacts with navigation application 104 through network 120 (e.g., wide area network, local area network, cellular data network, wireless network, the Internet, etc.) to provide navigation application 104 with transit navigation data and information. For example, navigation server 112 can send navigation application 104 transit infrastructure data (e.g., locations of transit lines, transit stops, etc.). Navigation server 112 can send navigation application 104 transit schedule information (e.g., arrival and departure schedules for various transit lines at various transit stops). Navigation server 112 can send navigation application 104 transit vehicle information (e.g., transit vehicle recommendations, occupancy status, exit suggestions, etc.). Navigation server 112 can send navigation application 104 user transit route suggestions (e.g., suggested routes for a user to travel from a start location to a destination location using public transit lines). Navigation server 112 can send navigation application 104 other public transit related information as may be described herein below.

In some implementations, system 100 can include server device 130. For example, server device 130 can be a computing device configured to provide information to server device 110 to support the transit navigation features described herein. For example, server device 130 can include transit server 132. Transit server 132 can be a software process associated with a public transit authority or other public transit managing entity. Transit server 132 can manage transit related information, such as transit line schedules, transit infrastructure maps (e.g., layouts or maps of transit stations, transit lines, etc.), transit vehicle occupancy status, and/or other transit related information specific to a particular transit system managed by the public transit authority associated with transit server 132. Transit server 132 can send transit the transit related information described herein to navigation server 112 so that navigation server 112 can generate user transit route recommendations for a user of user device 102 and send the appropriate transit information to navigation application 104 to support the transit related features described herein.

Presenting Nearby Transit Options

Figure 2:
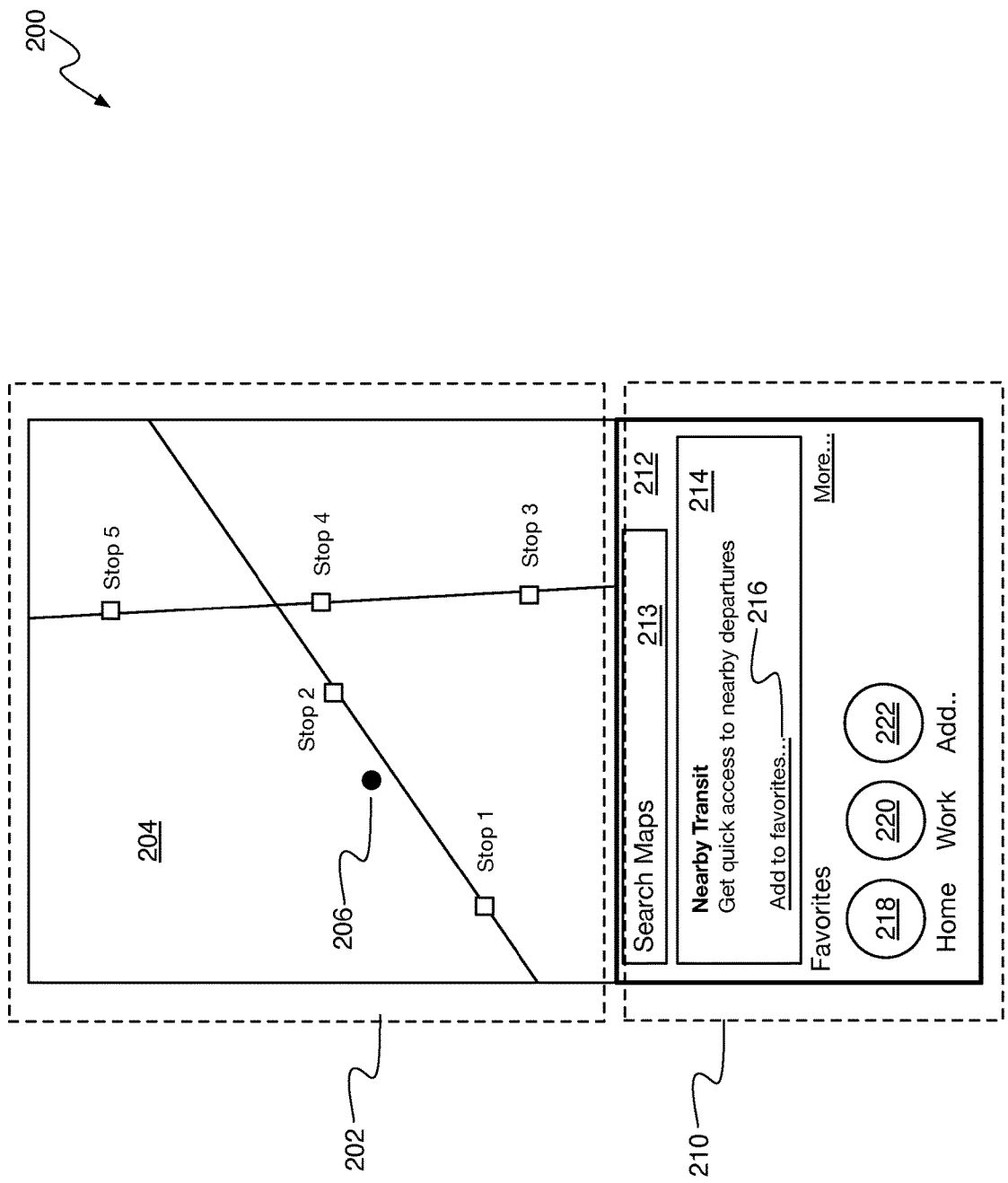
FIG. 2 illustrates an example graphical user interface 200 for adding a "nearby transit" graphical element to a placecard.

FIG. 2 illustrates an example graphical user interface 200 for adding a "nearby transit" graphical element to a placecard presented by navigation application 104 on a display associated with user device 102. For example, navigation application 104 can present the various graphical user interfaces described herein on an internal display of user device 102, an external display of user device 102, or an internal display of another computing device (e.g., an in-car system, wearable computing device, set-top box, etc.). However, in most cases, user device 102 will likely present the graphical user interfaces described herein on an internal display of user device 102.

In some implementations, graphical user interface (GUI) 200 can include a map view 202. For example, map view 202 can present map 204 of a geographic region corresponding to the location of user device 102 or some other geographic region specified by the user of user device 102. Map view 202 can include a current location indicator 206 indicating the current location of user device 102. Depending on the transportation mode (e.g., walking, driving, public transportation, biking, etc.) selected by the user, map 204 presented in map view 202 may highlight different features presented on map 204. For example, as illustrated by map view 202, when the user selects public transit as the transportation mode, map 204 in map view 202 can highlight the public transit infrastructure available in the geographic region presented by map 204. In the example of FIG. 2, map 204 in map view 202 can highlight transit stations (e.g., transit stops 1, 2, 3, 4, 5) and the transit lines running through the transit stations.

In some implementations, graphical user interface 200 can include a placecard view 210. For example, placecard view 210 can be an overlay presented over a portion, or all, of map view 202. Placecard view 210 can present various informational and/or interactive placecards. For example, placecard view 210 can present placecards that describe map items presented by map 204 in map view 202. Placecard view 210 can present placecards (e.g., placecard 212 and other placecards described below) that provide interactive elements that allow the user to manipulate the map data presented in map view 202.

In some implementations, placecard view 210 can present placecard 212. For example, placecard 212 can be a placecard that allows a user to search and/or browse for destination locations to which the user of user device 102 may wish to navigate. Placecard 212 can include graphical element 213 (e.g., a text input box) for defining search parameters, that when entered by the user, causes navigation application 104 to initiate a search for locations (e.g., points of interest, street names, city names, etc.) that match the user specified search parameters. Placecard 212 can include graphical elements 218 and 220 that, when selected by the user, select the corresponding destination (e.g., home, work, school, other favorite locations specified by the user, etc.) as a location to present on map 204 and/or as a destination for navigation routing. Placecard 212 can include graphical element 222 for adding a new favorite destination to placecard 212. For example, when selected by the user, graphical element 222 can cause navigation application 104 to present another graphical user interface through which the user can specify a new favorite location and/or locations to add to placecard 212.

In some implementations, placecard 212 can present graphical element 214 for prompting the user to add a "nearby transit" graphical element to placecard 212. For example, when navigation application 104 determines that the user has used, or is using, transit mode features of navigation application 104, navigation application 104 can present graphical element 214 to prompt the user to add a "nearby transit" graphical element to placecard 212. The "nearby transit" graphical element, when selected, can cause navigation application 104 to present public transit options that are near the current location of user device 102 and/or departing within a threshold period of time, as described in further detail below. The "nearby transit" feature will allow the user to quickly, and with minimum input (e.g., a single input from placecard 212), view transit options for an imminent trip or journey contemplated by the user. If the user wishes to add the "nearby transit" affordance (e.g., graphical element, butting, link, etc.) to placecard 212, the user can select graphical element 216. Alternatively, the user can select graphical element 222 to add the "nearby transit" affordance to placecard 212 from another graphical user interface that presents "nearby transit" as a location that can be added to the user's favorites on placecard 212, as described above.

Figure 3:
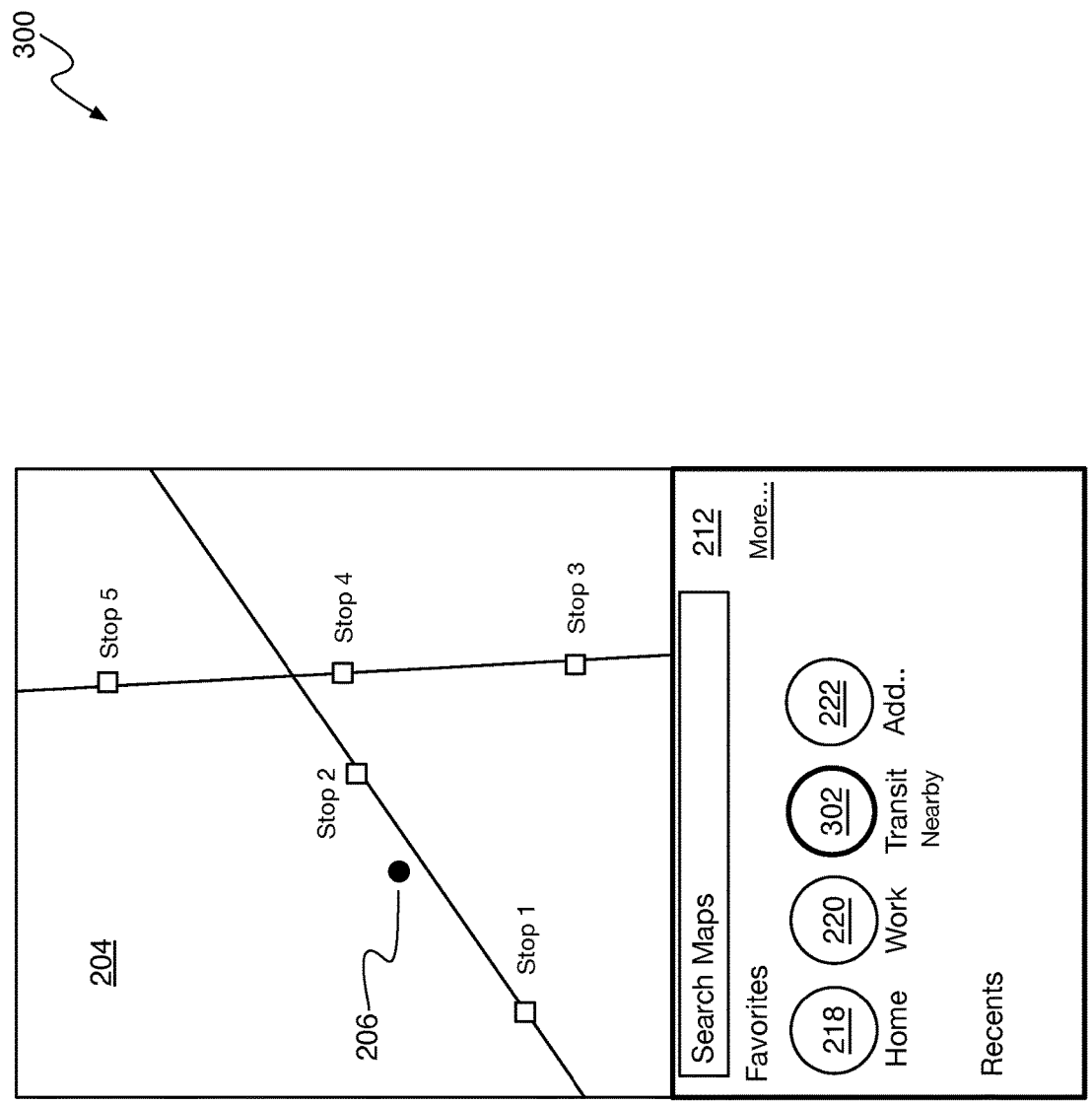
FIG. 3 illustrates an example graphical user interface for presenting a "nearby transit" affordance.

FIG. 3 illustrates an example graphical user interface 300 for presenting a "nearby transit" affordance. For example, in response to the user selecting to add "nearby transit" as a favorite to placecard 212, navigation application 104 can add graphical element 302 (e.g., affordance, button, link, etc.) to the list of favorite locations presented on placecard 212. A user can select graphical element 302 to cause navigation application 104 to present nearby transit options, as described with reference to the figures below. In some implementations, nearby transit options can be presented automatically. For example, navigation application 104 may present nearby transit options on map 204 automatically (e.g., without presenting graphical element 302 and/or receiving user input) when nearby transit options are available, as described further below.

Figure 4:
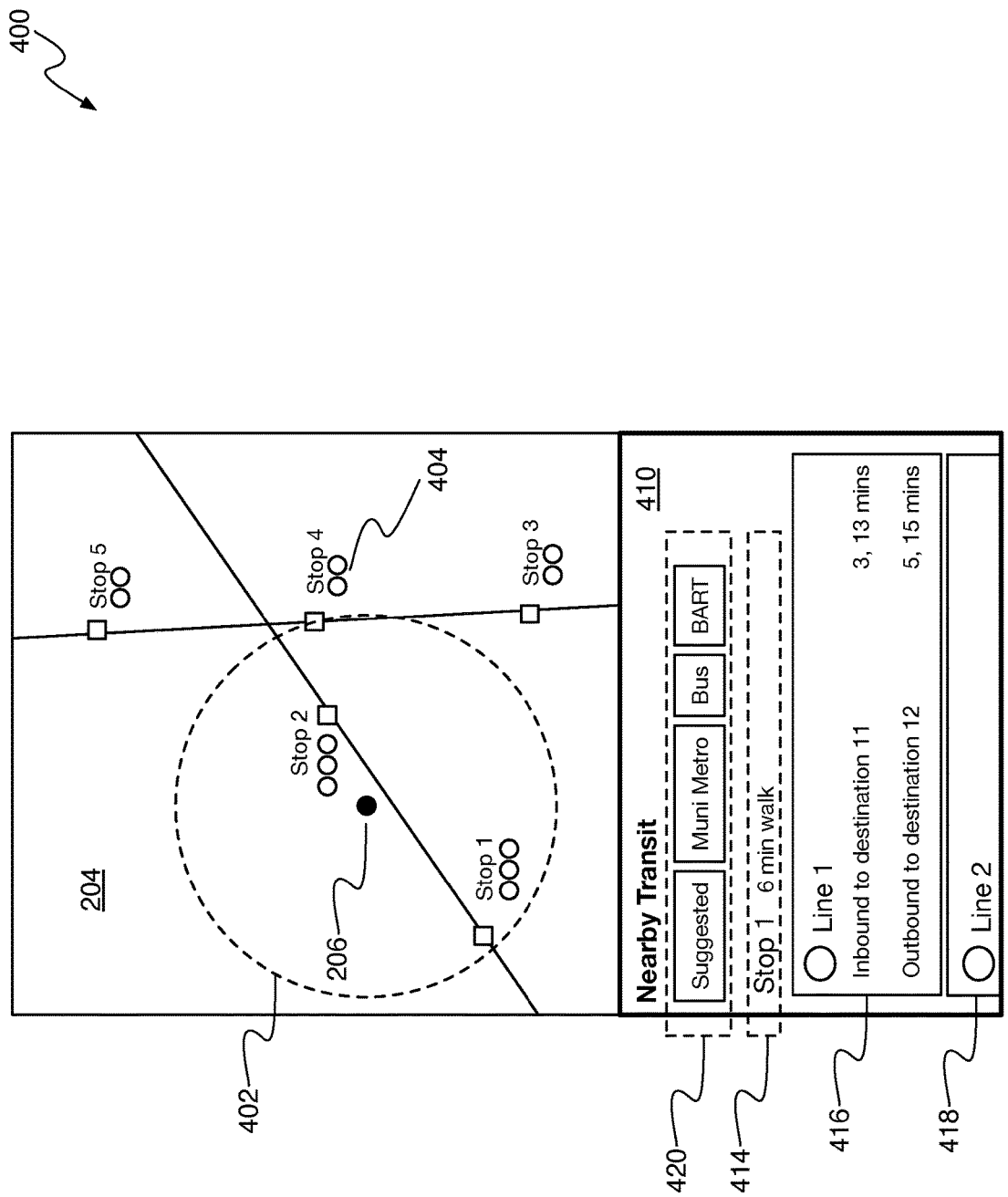
FIG. 4 illustrates an example graphical user interface for presenting nearby transit options.

FIG. 4 illustrates an example graphical user interface 400 for presenting nearby transit options. For example, GUI 400 can be presented in response to a user selecting graphical element 302 presented on placecard 212 of GUI 300. Like GUI 200 and GUI 300, GUI 400 can present a map view including map 204 that highlights transit infrastructure near the current location of user device 102, as indicated by location indicator 206. Map 204 can show the various transit stations (e.g., stop 1, stop 2, stop 3, stop 4, stop 5, etc.) within the geographic region represented by map 204 and the transit lines that run through the transit stations. In some implementations, transit stations can be annotated with graphical elements 404 (e.g., color coded shapes, circles, squares, images, badges, text, etc.) that represent or identify the transit lines that stop at each station.

In some implementations, placecard 410 presented on GUI 400 can present information related to various transit stops within a threshold distance of user device 102. For example, in response to receiving user input selecting graphical element 302, navigation application 104 can determine transit stations within a threshold distance (e.g., represented by dashed circle 402 which may or may not be displayed on GUI 400) of user device 102. The threshold distance (e.g., nearby transit threshold) can correspond to a particular distance (e.g., 1 mile, 1.5 miles, 2 miles, etc.) that can be configured by the user of navigation application 104 through a configuration GUI of navigation application 104. The threshold distance can correspond to an amount of time (e.g., 10 minutes, 15 minutes, 20 minutes, etc.) that may represent the amount of time (e.g., maximum walk time) the user is willing to walk to nearby transit stations. The maximum walk time can be configured by the user of navigation application 104 through a configuration GUI of navigation application 104. The amount of time can be converted into a distance based on an average walking speed of the general population or based on an average walking speed of the particular user of user device 102 (e.g., based on historical walking or exercise data collected by user device 102).

To determine transit stations within the nearby transit threshold distance, navigation application 104 on user device 102 can obtain transit data that describes the transit infrastructure in the geographic region presented by map 204 from navigation server 112 on server device 110. For example, navigation application 104 can obtain the transit data from navigation server 112 in response to receiving the user selection of graphical element 302. Navigation application 104 can obtain the transit data from navigation server 112 prior to receiving the user selection of graphical element 302. For example, navigation application 104 can obtain the transit data from navigation server 112 automatically during an idle period of user device 102, when the user invokes navigation application 104, on a recurring time interval, or in response to some other trigger. The transit data can include locations of transit stations, identification of transit lines that stop at each station, arrival and/or departure schedules for each transit line at each transit station, and any other transit data that may be described herein.

Navigation server 112 may obtain the transit data from transit server 132 on server device 130. For example, system 100 may include various transit servers 132 running on different server devices 130 where each transit server 132 is associated with and/or managed by a different transit authority. Thus, navigation server 112 may obtain transit data from different transit servers 132 that describe various, different transit systems. Navigation server 112 can then send transit data relevant to the current location of user device 102 (or some other location specified by the user) to navigation application 104.

Navigation application 104 can compare the current location of user device 102 to the locations of the transit stations identified in the transit data to determine which transit stations are within the threshold distance determined (e.g., as specified by the user, as indicated in a default setting, etc.) for determining nearby transit stations, as described above. The transit stations that are determined to be within a threshold distance of user device 102 can be identified as nearby transit stations.

In some implementations, navigation application 104 can filter transit departures at each nearby transit station based on time of departure. For example, when the user selects to view nearby transit stations, the user is likely considering traveling on a transit line within a short period of time (e.g., the next 30 minutes, the next 45 minutes, etc.) of when the user invoked the nearby transit function of navigation application 104. Thus, in some implementations, navigation application 104 can filter out transit lines, and/or transit stations, that do not have departures within a threshold period of time (e.g., departure threshold) of when the user selects to view nearby transit stations.

For example, the departure threshold time can be calculated based a walk time representing an estimated amount of time to walk to a transit station plus a wait time at the station representing an amount of time the user is willing to wait at the station for a departure. For example, the walk time can correspond to the nearby transit threshold distance converted to an estimated time to walk the nearby transit threshold distance. The walk time can correspond to the maximum walk time. The walk time can correspond to an estimated time to walk to each particular station. In this case, this departure time filter may be applied differently at each nearby transit station according to the difference in distance between the current location of user device 102 and the corresponding nearby transit station. The wait time can be a default period of time or user configured period of time indicating the amount of time the user is willing to wait at the station for a transit line departure. For example, using the estimated time to walk to each particular station as the walk time, if it would take the user 5 minutes to walk to Stop 2 and the wait time is 10 minutes, then navigation application 104 can determine departures to present for Stop 2 that are within 15 minutes (e.g., 5 minutes walk time plus 10 minutes wait time=15 minutes departure filter) of when the user selected to view nearby transit options. Similarly, if it would take the user 10 minutes to walk to Stop 1 and the wait time is 10 minutes, then navigation application 104 can determine departures to present for Stop 2 that are within 20 minutes (e.g., 10 minutes walk time plus 10 minutes wait time=15 minutes departure filter) of when the user selected to view nearby transit options. Thus, a different time filter can be applied to different stations in response to a particular invocation of the nearby transit function.

In some implementations, placecard 410 can present nearby transit stops and corresponding transit line departures. For example, navigation application 104 can present a list of transit stations (e.g., stop 1, stop 2, stop 4, etc.) that are within the nearby transit threshold distance (e.g., as indicated by dashed line 402). The transit stations can be sorted in the list according to various criteria. For example, the transit stations can be sorted alphabetically by name (e.g., A-Z, Z-A, etc.). The transit stations can be sorted based on distance from the current location of user device 102 (e.g., closest to farthest, farthest to closest, etc.). The transit stations can be sorted based on popularity (e.g., the most popular with the user of user device 102, the most popular among all users within a local geographic area, etc.) derived from on historical user data. The identifier (e.g., name) for each transit station and the distance and/or time to walk to the corresponding transit station can be presented on placecard 410, as illustrated within dashed box 414.

In some implementations, each transit station (e.g., transit stop) can be presented in association with graphical elements (e.g., graphical elements 416, 417, etc.) representing the transit lines that stop at the corresponding transit station. For example, transit station "Stop 1" can be associated with transit line 1 (graphical element 416) and/or transit line 2 (graphical element 418). Each transit line graphical element (e.g., graphical elements 416, 418, etc.) can include an identifier (e.g., name, image, graphic, icon, etc.) for the corresponding transit line. Each transit line graphical element can include a badge (e.g., an image that has a unique color, shape, text, etc.) that can be used to identify the corresponding transit line.

Navigation application 104 can present transit departures for each transit line presented on placecard 410. For example, navigation application 104 can present transit line departure information for each destination (e.g., end of line stop, next stop, etc.) served by a transit line. For example, graphical element 416 corresponding to transit line 1 can present information describing an inbound departure to a destination (e.g., destination 11) and a departure schedule for the inbound departure (e.g., departs in 3 minutes and 13 minutes). graphical element 416 corresponding to transit line 1 can present information describing an outbound departure to a destination (e.g., destination 12) and a departure schedule for the outbound departure (e.g., departs in 5 minutes and 15 minutes).

In some implementations, navigation application 104 may present a limited number of transit lines and/or transit departures on placecard 410. For example, navigation application 104 may present less than the total number of transit lines and/or transit departures for a transit stop. Navigation application 104 can, for example, present the 2 or 3 transit lines for each stop that have departures occurring the soonest relative to the current time at which the user is viewing placecard 410. Similarly, navigation application 104 can, for example, present the 2 or 3 transit departures for each stop that will occur the soonest relative to the current time at which the user is viewing placecard 410.

In some implementations, navigation application 104 can present graphical elements 410 representing the various transit systems corresponding to the transit lines presented on nearby transit placecard 410. As described above, multiple different transit systems can provide transit information to navigation server 112. Navigation server 112 can aggregate the transit system information and provide the transit system information to navigation application 104. Navigation application 104 can present the transit information (e.g., transit stops, transit lines, departure schedules, etc.) on various GUIs of navigation application 104, including nearby transit placecard 410. Navigation application 104 can filter the transit information presented on placecard 410, and/or other user interfaces, in response to receiving user input selecting one or more of the transit systems represented by graphical elements 410. For example, a user can select the "suggested" graphical element to cause navigation application 104 to present transit lines suggestions selected based on historical transit system use data associated with the user of user device 102. A user can select the graphical element associated with a particular transit system (e.g., "muni metro," "BART," "Bus," etc.) to cause navigation application 104 to present transit lines corresponding to the selected transit system and hide other transit systems that are not currently selected.

Additional transit stops and/or transit lines can be included lower on placecard 410 (e.g., off display). These additional transit stops and/or transit lines can be presented when the navigation application 104 receives user input indicating that the user would like to maximize placecard 410 from its current mid-screen presentation, as illustrated by FIG. 4, FIG. 5, and other figures described herein.

Figure 5:
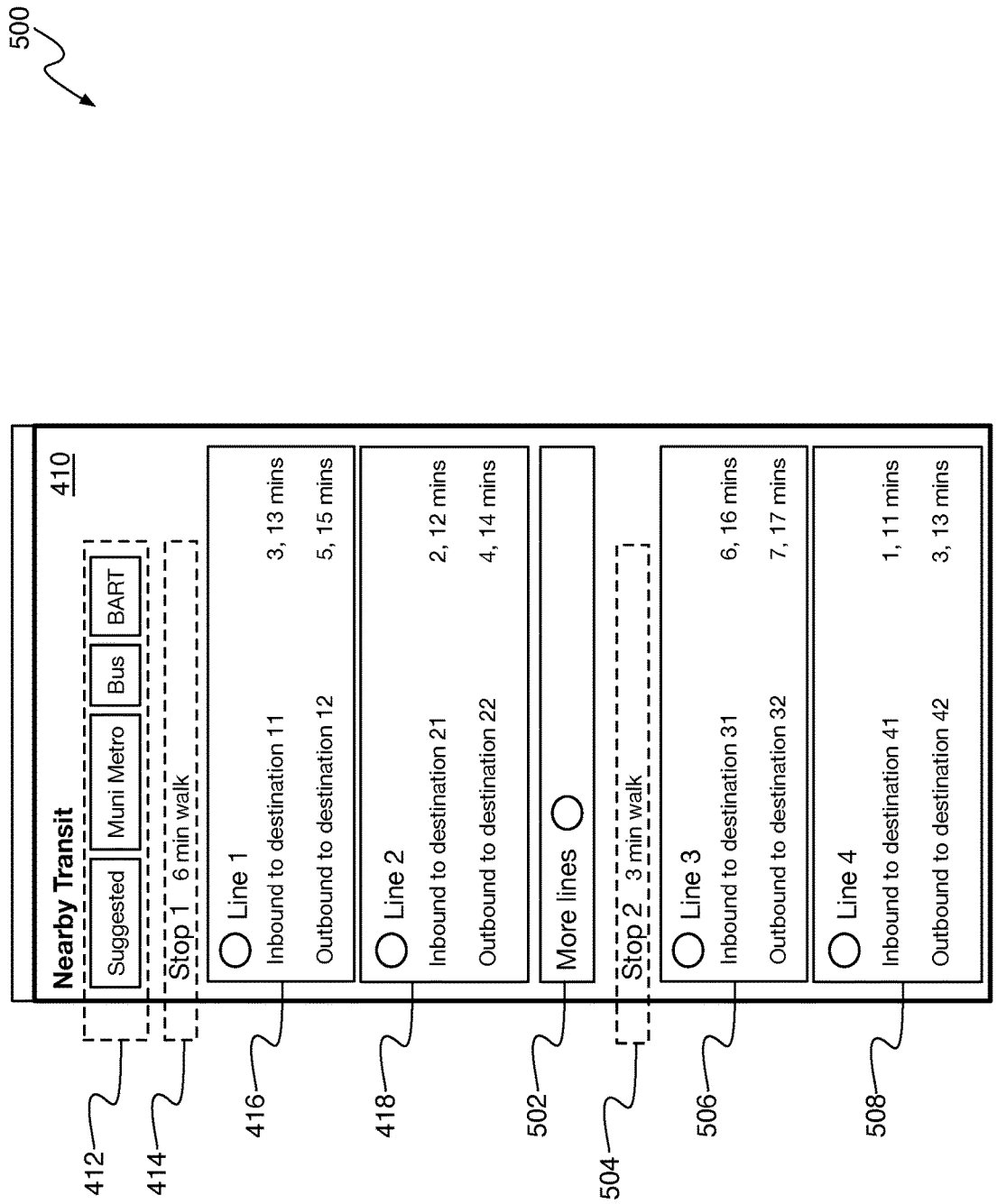
FIG. 5 illustrates an example graphical user interface with a maximized nearby transit placecard 410.

FIG. 5 illustrates an example graphical user interface 500 with a maximized nearby transit placecard 410. For example, graphical user interface 500 can be presented by navigation application 104 in response to receiving user input indicating that the user would like to maximize (e.g., display at full screen, or near full screen) nearby transit placecard 410. The user may provide this input by selecting placecard 410 at mid-screen level, or a minimized bottom screen level, and dragging placecard 410 to the top of the display screen on which GUI 400 is presented (e.g., the internal display of user device 102, or some other display as described above). As with all other user input described herein, the user input can be received as touch input to a touch screen display associated with user device 102 or through some other input device, such as a keyboard, mouse, touch sensitive pad, or other input device.

In some implementations, when navigation application 104 presents a limited number of transit lines for a particular transit stop and more transit lines are available, navigation application 104 can present graphical element 502. For example, when graphical element 502 is selected by the user, navigation application 104 can present additional transit lines for the particular transit stop in response to the user selection of graphical element 502. The additional transit lines can be added (e.g., inserted in the list of transit lines) to the information presented for the particular transit stop on placecard 410. The additional transit lines can be presented on a different placecard that may be presented by navigation application 104 in response to the selection of graphical element 502.

In some implementations, the maximized view of nearby transit placecard 410 can present additional transit stops, transit lines, and/or transit departures not previously presented on the mid-screen level placecard 410. For example, maximized placecard 410 can present information 504 describing an additional transit station (e.g., "Stop 2") and corresponding transit lines and departures, as represented by graphical elements 506 and 508. In some implementations, in response to user input (e.g., a touch input gesture swiping up or down on placecard 410) indicating the user would like to scroll the list of transit stations presented on placecard 410, navigation application 104 may cause placecard 410 to scroll the list of transit information to present additional transit stops that may be hidden off screen.

Figure 6:
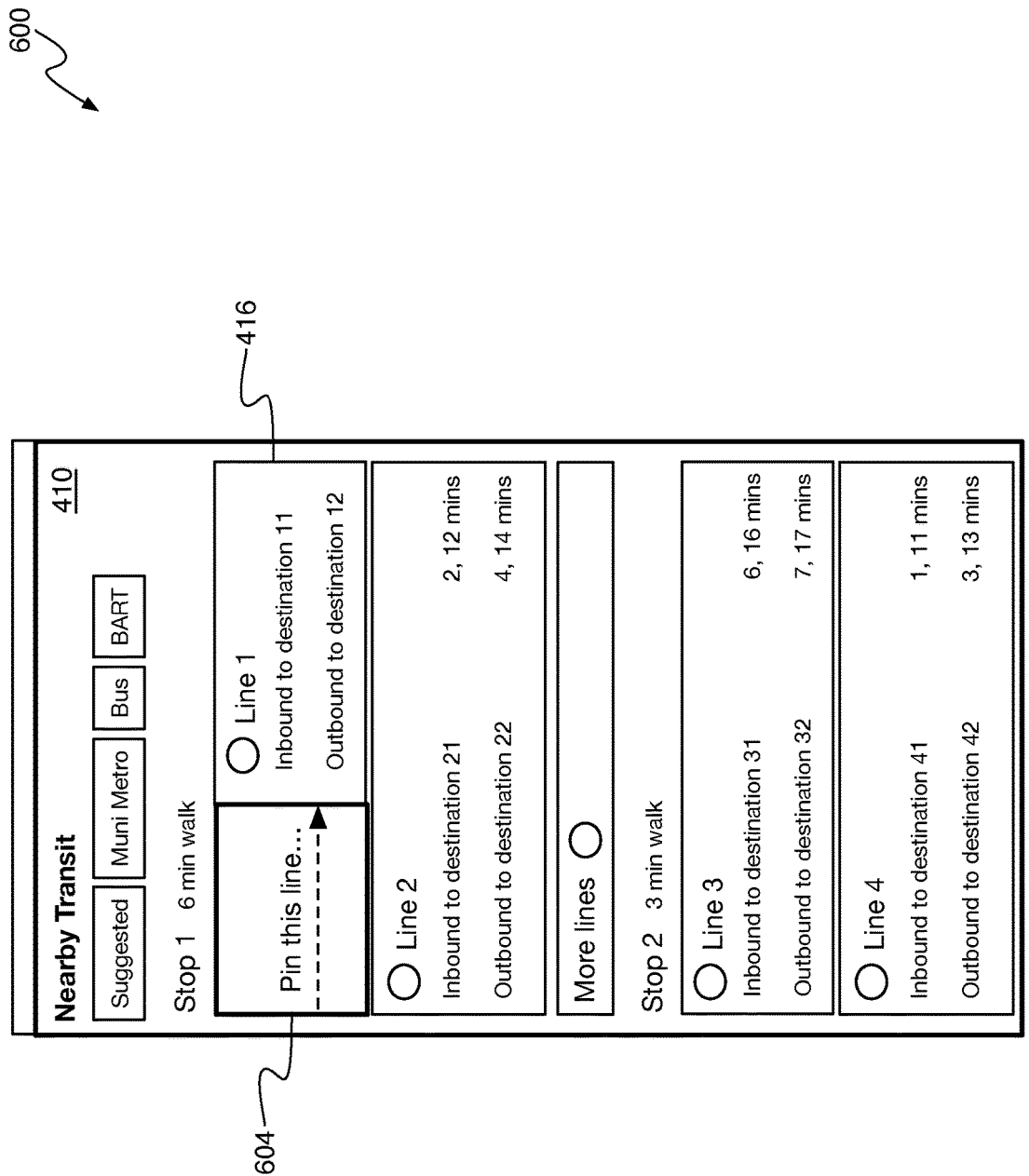
FIG. 6 illustrates an example graphical user interface for pinning a favorite transit line to the top of nearby transit placecard 410.

FIG. 6 illustrates an example graphical user interface 600 for pinning a favorite transit line to the top of nearby transit placecard 410. For example, a user may regularly travel a particular transit line. To make it easier for the user to access information about the transit line, the user can pin the transit line to the top of nearby transit placecard 410. To do so, the user can provide input to graphical element 416 representing a particular transit line (e.g., Line 1, at Stop 1) to reveal graphical element 604 corresponding to a pinning affordance. The user input can be a touch and drag touch gesture with respect to graphical element 416 and graphical element 416 can be animated to reveal graphical element 604 corresponding to the pinning affordance. In some implementations, the touch and drag input can be performed in a left to right direction, as illustrated by the dashed arrow within graphical element 604, and the animation can move in the same direction as the input to reveal graphical element 604 and shrink graphical element 416. However, other implementations may provide for different types of inputs (e.g., a tap touch gesture, mouse input, keyboard input, etc.) and/or present different types of user experiences to allow the user to pin a transit line to the top of nearby transit placecard 410. For example, a long touch and hold input to graphical element 416 may directly cause the pinning of the corresponding transit line without performing an animation to reveal the pinning affordance and requiring subsequent user input to trigger the pinning function.

Figure 7:
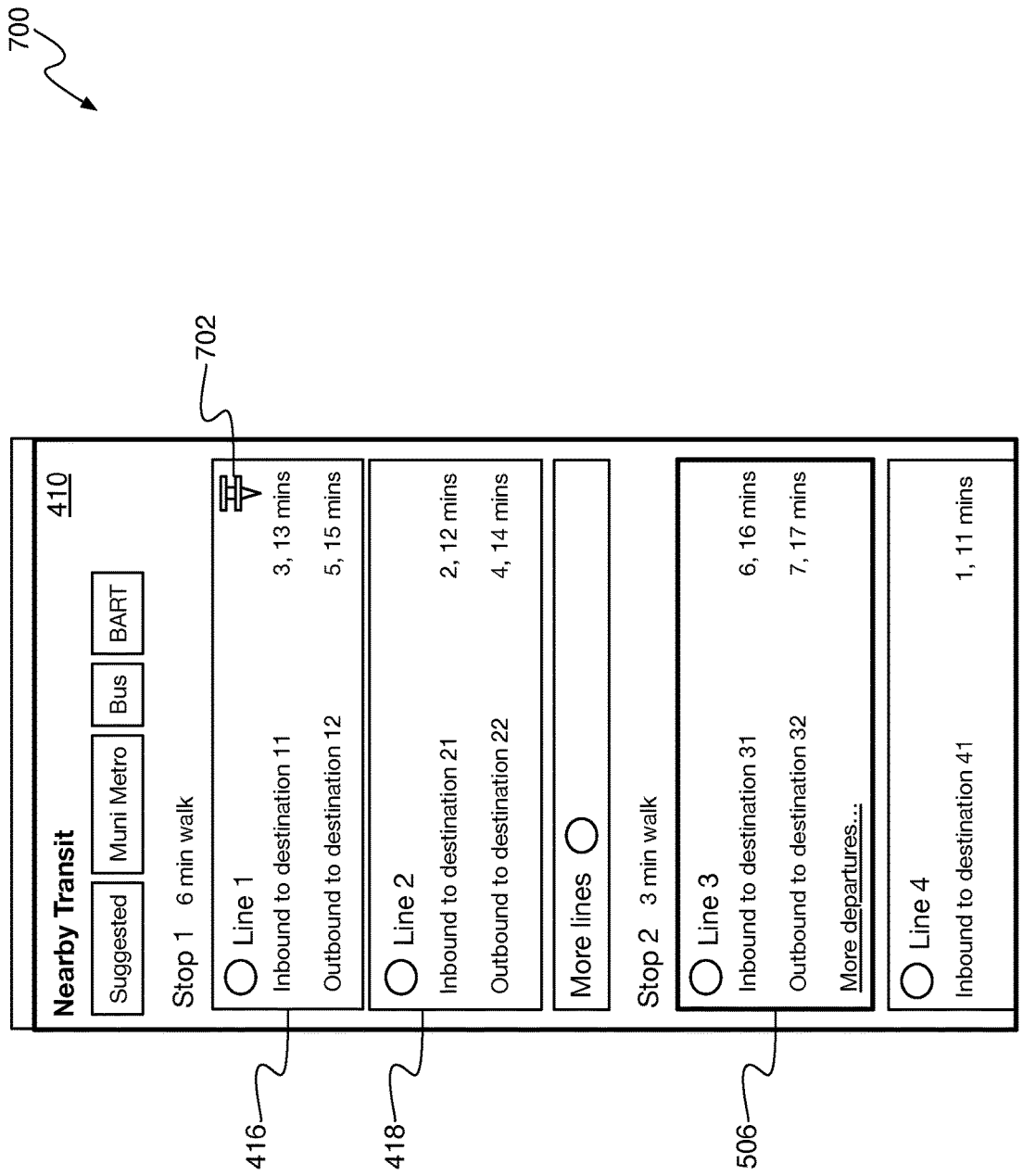
FIG. 7 illustrates an example graphical user interface for presenting a pinned transit line.

FIG. 7 illustrates an example graphical user interface 700 presenting a pinned transit line. For example, a transit line that has been previously pinned by the user may be presented in a prominent and/or highlighted position on nearby transit placecard 410 when the transit line is associated with a transit station (e.g., transit stop) that is within the nearby transit threshold distance, as described above. In some implementations, placecard 410 can present a pinned transit line section near the top of placecard 410 (e.g., below the transit system filters and above the listing of transit stops) that presents a list of pinned transit lines so that the user can quickly see and access their favorite transit lines that are within the nearby transit threshold distance.

In some implementations, a pinned transit line can be presented at the top of the list of transit lines presented for a particular stop. For example, with reference to Stop 1 presented on nearby transit placecard 410, transit line 1 (e.g., graphical element 416) is a pinned transit line, as indicated by pinned indicator 702. Line 2 (e.g., graphical element 418) is not a pinned transit line. Thus, graphical element 416 corresponding to the pinned transit line 1 will be presented in a more prominent position (e.g., at the top of the list of stops for Stop 1) than graphical element 418 corresponding to transit line 2.

In some implementations, a user can select a graphical element corresponding to a particular transit line (e.g., Stop 2, Line 3) to cause navigation application 104 can present additional information about the particular transit line. For example, navigation application 104 can present graphical user interface 800 of FIG. 8 in response to the user selecting graphical element 506 and/or an affordance (e.g., a link, button, etc.) presented on graphical element 506.

Figure 8:
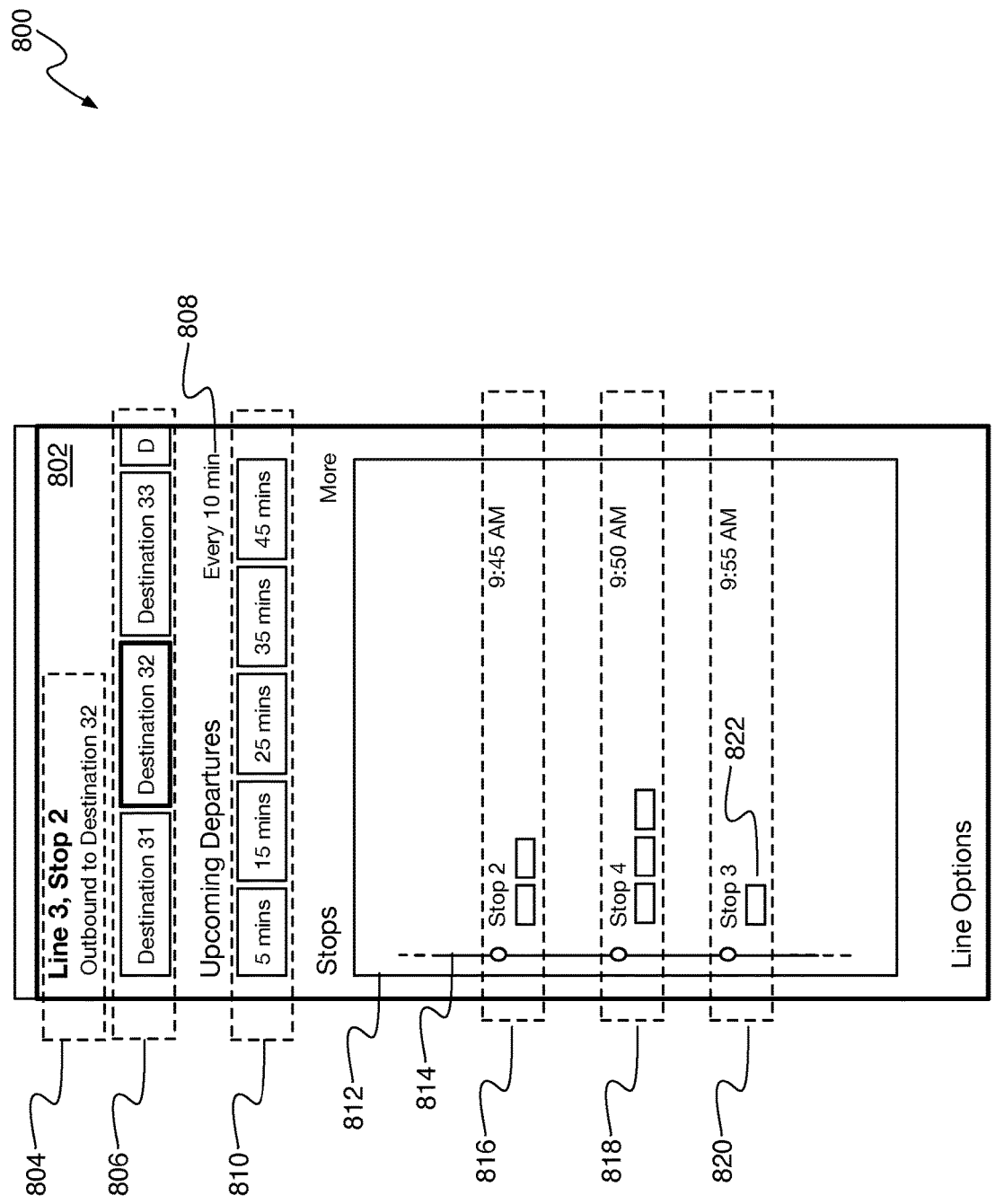
FIG. 8 illustrates an example graphical user interface for presenting a detailed view of a selected transit line.

FIG. 8 illustrates an example graphical user interface 800 for presenting a detailed view of a selected transit line. For example, graphical user interface 800 can be presented by navigation application 104 in response to receiving user input selecting a transit line presented on nearby transit placecard 410. GUI 800 can include transit line details placecard 802 that presents a detailed view of the selected transit line on placecard 802, for example.

In some implementations, placecard 802 can present information area 804 describing the selected transit line. For example, information area 804 can include an identifier for the selected transit line (e.g., Line 3), an identifier for the selected transit station (e.g., Stop 2), a direction of travel for the selected transit line from the transit stop (e.g., inbound, outbound, etc.), and/or a destination transit station for the transit line (e.g., a terminal transit stop, next transit stop, etc.).

In some implementations, placecard 802 can include graphical elements 806 for selecting or changing the destination transit station for the user's current transit trip. For example, the selected transit line may go to several destination transit stations. Placecard 802 can present graphical elements 806 representing the destination transit stations served by the selected transit line. A user can scroll through graphical elements 806 if there are more destinations than can fit on placecard 802. Changing the selected destination may cause the departure schedules (e.g., graphical elements 810) and/or transit trip overview (e.g., graphical element 812) presented on placecard 802 to change to reflect the latest selected destination. The currently selected destination station can be described in information area 804 and/or the corresponding graphical element 806 can be highlighted or emphasized, as illustrated with reference to "Destination 32".

In some implementations, placecard 802 can present information 808 and/or graphical elements 810 describing upcoming departure schedules. For example, for recurring periodic departures (e.g., departures occurring on a regular interval), information 808 can describe a time interval for departures. When departures are not on a regular interval, information 808 can describe an amount of time until the next departure.

In some implementations, placecard 802 can include graphical elements 810 representing a sequence of departure times for the selected transit line. For example, graphical elements 810 can be interactive graphical elements each representing different departure times in the departure schedule. If there are more departure times than can fit on placecard 802, a user can scroll graphical elements 810 to cause navigation application 104 to present additional departure times that may be hidden off screen.

In some implementations, each graphical element 810 can indicate an amount of time until a corresponding departure. For example, each graphical element 810 can indicate a departure time relative to the current time (e.g., 5 minutes from now). In some implementations, each graphical element 810 can indicate a time of day when the corresponding departure will occur. For example, each graphical element 810 can indicate an absolute time of day when the corresponding departure will occur. (e.g., 10:45 am). Each graphical element 810 can represent a different and distinct departure time from other graphical elements 810. Graphical elements 810 can be ordered by time (e.g., soonest to latest, smallest to largest, etc.) when presented on placecard 802.

In some implementations, placecard 802 can include a transit trip overview area 812. For example, overview area 812 can present a representation of the selected transit line 814 (e.g., line 3) and the schedule of stops (e.g., information elements 816, 818, 820, etc.) along the transit line from the selected starting transit station (e.g., stop 2, information element 816), through intermediate transit stations (e.g., stop 4, information element 818) to the currently selected destination station (e.g., destination 32, stop 3, information element 820). Each information element 816, 818, 820 can include a departure time (or arrival time) for the corresponding stop.

Presenting Transit Navigation Instructions

Figure 9:
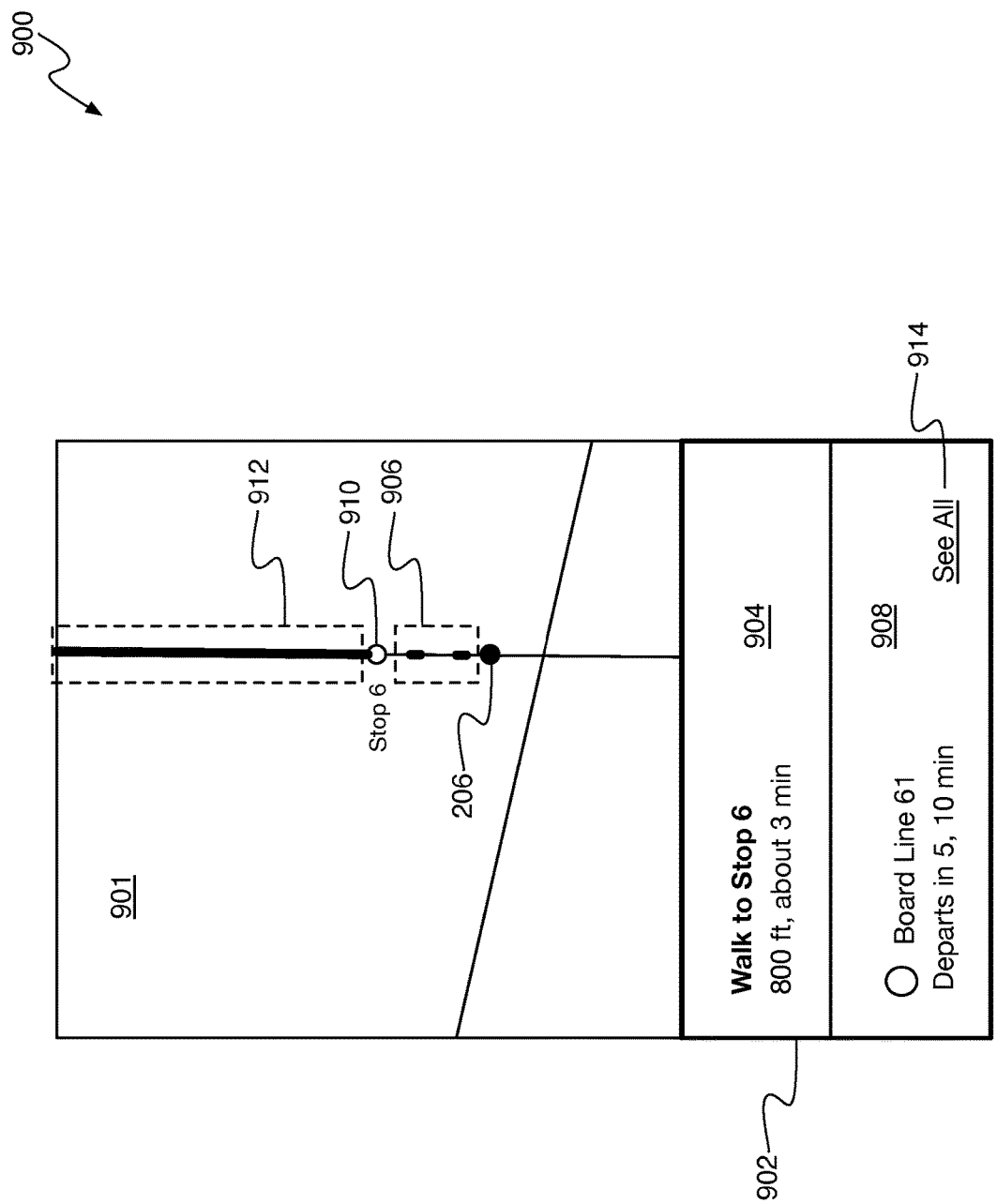
FIG. 9 illustrates an example graphical user interface for presenting navigation instructions for a transit route generated for a user.

FIG. 9 illustrates an example graphical user interface 900 for presenting navigation instructions for a transit route generated for a user. For example, a user can provide input to a graphical user interface of navigation application 104 specifying parameters for a transit route request. The parameters can include a start location (e.g., the current location of user device 102 or other starting location), a destination location (e.g., a selected point of interest, address, etc.), a transportation mode (e.g., private vehicle, public transit, bicycle, walking, etc.), and/or a start time or arrival time for the requested route. For example, the user may specify a start or arrival time for the route corresponding to a time when the user would like to leave their start location or a time that they would like to arrive at their destination. For the purposes of the descriptions that follow, the user has selected public transit (e.g., train, light rail, subway, bus, etc.) as the transportation mode. In response to receiving the user input, navigation application 104 can communicate with navigation server 112 to generate a transit route based on the specified parameters.

In some implementations, navigation server 112 can generate route data describing a route determined for the user based on the user parameters received from navigation application 104 and send the route data to navigation application 104 for presentation to the user. In some implementations, navigation server 112 can send transit map data (e.g., prior to the user's transit route request, after the user's request, in response to the user's request, etc.) to navigation application 104 and navigation application 104 can determine the transit route for the user based on the specified parameters.

In some implementations, navigation application 104 can determine a sequence of instructions to present to the user for navigating the transit route requested by the user. In the transit example, navigation application 104 can generate instructions describing portions of the transit route related to 1) traveling from the user's current location to the transit station where the user will board a transit line, 2) boarding a transit vehicle at the transit station, 3) exiting the transit vehicle, 4) traveling from the transit station where the user exits the transit vehicle to the destination location, and 5) arrival at the destination. In some cases, navigation application 104 may include multiple boarding and exiting instructions when there are transfers between lines while traversing the transit route generated for the user.

In some implementations, GUI 900 can present map 901 representing a first portion of the user's transit route. Map 901 can present indicator 206 showing the current location of user device 102, a first portion of the user's route 906 (e.g., a walking portion as indicated by the dashed line), a transit station 910, and a second portion of the user's route 912 (e.g., a transit portion as indicated by the solid line).

In some implementations, GUI 900 can present a navigation instruction placecard 902 for presenting navigation instructions corresponding to the transit route presented on map 901. In the mid-screen position illustrated by FIG. 9, placecard 902 may present a limited number (e.g., 1, 2, etc.) of navigation instructions to aid the user when traversing the transit route. When the user first starts the transit trip, placecard 902 may present an instruction 904 describing how the user may travel from the current location of user device 104 to the transit station where the user will board a transit vehicle. Instruction 904 can describe a mode of transportation (e.g., walk, drive, bike, etc.) for the first portion of the transit trip and an identifier for the transit station where the user will board a transit vehicle for the transit trip.

Instruction 904 can indicate a distance between the current location of user device 102 and the transit station. Instructions 904 can indicate an estimated amount of time that navigation application 104 has calculated for traveling from the current location of user device 102 based on the transportation mode for the first portion of the route. The information presented by instruction 904 may be updated as user device 102 changes location. For example, as user device 102 moves closer to the transit station the distance to the transit station and travel time can be updated.

In some implementations, placecard 902 can include navigation instruction 908 that provides boarding instructions for a transit vehicle at the first transit station. For example, instruction 908 may include an identifier (e.g., text, image, badge, etc.) for the transit line the user will board when the user reaches the transit station and/or a departure schedule for the transit line, as illustrated by FIG.

9. The information presented by instruction 908 may be updated as time progresses. For example, in the case of a departure schedule expressed in relative time periods (e.g., departs in 5 minutes) rather than absolute time of day (e.g., 10:15 am) the departure schedule for the transit line can be updated in instruction 904 as time progresses and the user has less time to board the transit line for a particular departure. If the user wishes to see more departure times and/or a more detailed departure schedule for the transit line at transit station 906, the user can select graphical element 914. In response to receiving a selection of graphical element 914, navigation application 104 can present a detailed transit schedule for transit station 906 (e.g., transit stop 6) similar to GUI 800 of FIG. 8. Since the user has not yet reached transit station 910 and has not completed the portion of the transit route corresponding to instruction 904, instruction 908 can be presented below instruction 904 on placecard 902.

In some implementations, the navigation instructions for the portion of the transit route currently being traversed by the user (e.g., user device 102) can be presented at the top of placecard 902. For example, when the user has initiated a transit route navigation, the navigation instruction (e.g., instruction 904) for the first portion of the route can be presented at the top of placecard 902. When user device 102 reaches the end of the first portion of the route (e.g., walking portion 906), the instruction for first portion of the route can be removed from placecard 902 and the next portion (e.g., second portion of the route) can be presented at the top of placecard 902. Thus, when the user reaches transit station 910 where the user will board the transit line (e.g., board the transit vehicle on the transit line), instruction 904 can be removed from placecard 902 and instruction 908 identifying the transit line and/or transit vehicle to board can be moved to, or presented at, the top of placecard 902. Thus, placecard 902 can be updated as the user completes each portion of the transit route.

In some implementations, navigation application 104 can adjust the zoom level, orientation, and/or position of map 901 within the map view to frame the portion of the user's transit route corresponding to the current instruction presented at the top placecard 902. For example, while the walking instruction 904 is presented at the top of placecard 902, navigation application 104 can frame the walking portion 906 of the user's transit route near the center of the map view (e.g., the map portion of GUI 900) and/or orient the map according to the user's direction of travel while traversing the walking portion 902 of the user's transit route. As another example, while the user is riding a transit vehicle traversing the transit system portion of the user's transit route, navigation application can frame the transit system portion of the user's transit route near the center of the map view (e.g., the map portion of GUI 900) and/or orient the map according to the user's direction of travel while traversing the walking portion 902 of the user's transit route. The transit system portion of the user's transit route can be framed from the first transit station (e.g., boarding transit stop) to the last transit station (e.g., terminal transit station) on the user's transit route. The transit system portion of the user's transit route can be framed from the user's current location (e.g., updated as the user moves along the route) to the last transit station (e.g., terminal transit station) on the user's transit route.

Figure 10:
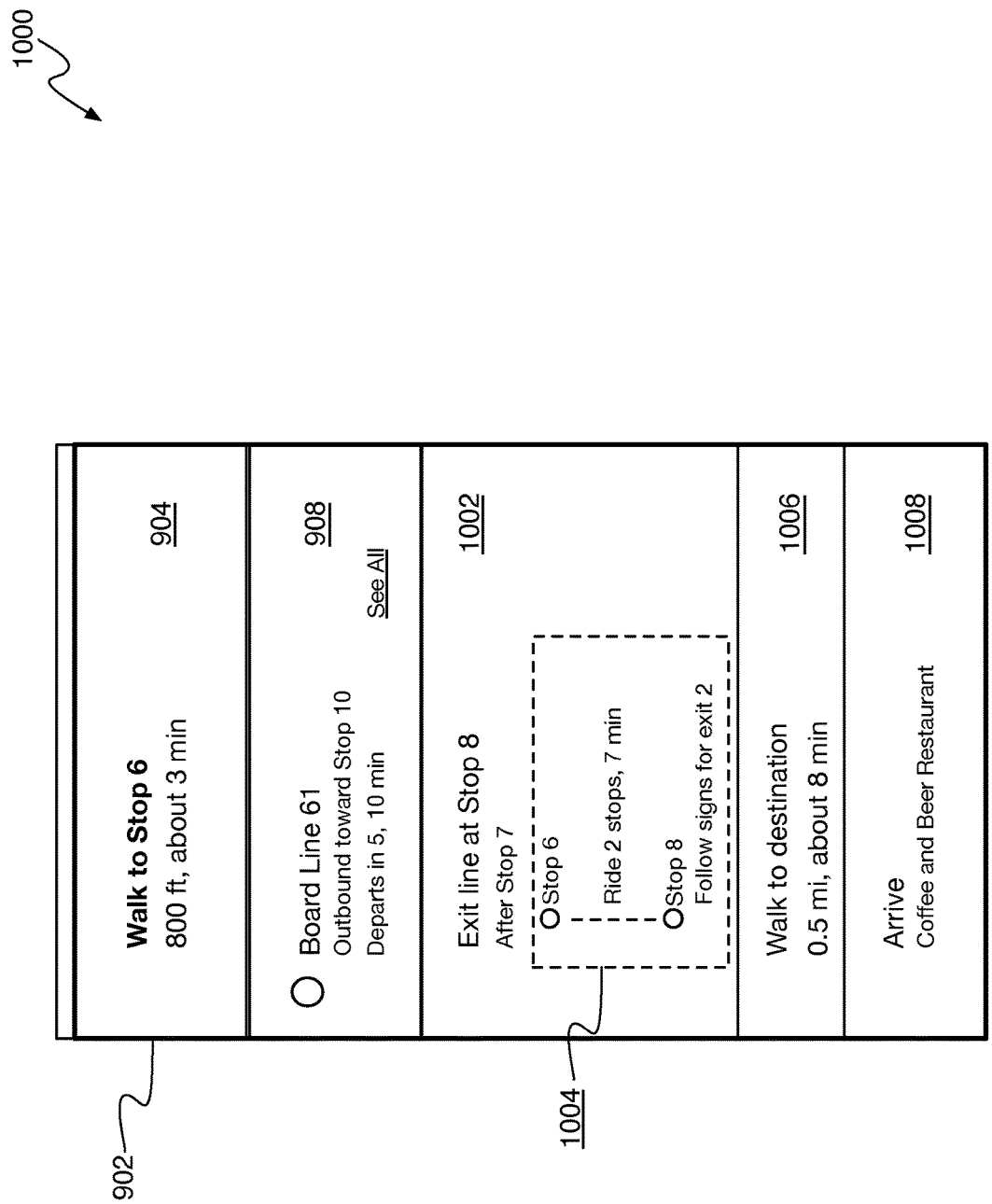
FIG. 10 illustrates an example graphical user interface for presenting a maximized navigation instruction placecard.

FIG. 10 illustrates an example graphical user interface 1000 for presenting a maximized navigation instruction placecard 902. For example, the user can provide user input to placecard 902 while placecard 902 is at mid-screen and/or minimized on a display to cause navigation application 104 to maximize placecard 902 to a full screen, or near full screen, size, as illustrated by FIG. 10. When placecard 902 is maximized, placecard 902 may present a greater number of instructions for the current transit route. For example, placecard 902 may present most, or all, of the navigation instructions for the transit route requested and/or being traversed by the user of user device 102. For example, in addition to the instruction 904 for walking the first portion of the transit route and/or the boarding instruction 908, placecard 902 can present instruction 1002 that includes an instruction to exit at an identified transit stop (e.g., "Exit line at Stop 8"). Instruction 1002 can provide additional details related to the instruction, such as identifying a preceding stop (e.g., "After stop 7") so that the user can prepare to exit the transit line (e.g., transit vehicle) after the user sees the transit vehicle has reached Stop 7 on the transit line.

Instruction 1002 can provide an overview 1004 of the transit system portion of the transit route. For example, transit overview 1004 can present a representation the transit portion of the transit route including the transit station at which the user should board the transit line and the station at which the user should exit the transit line. Transit overview 1004 may indicate the number of transit stations the transit portion will pass through and/or an estimated amount of time for traversing the transit portion of the transit route. Transit overview 1004 may present an instruction (e.g., "Follow signs for exit 2"). describing how to exit the transit station, or how to reach the next transit line when transferring between lines, at the end of the transit portion of the transit route.

In some implementations, placecard 902 can present transit line transfer instructions. For example, when a transit route generated for a user requires the user to transfer between transit lines during the transit portion of the transit route, navigation application 104 can present additional walk (e.g., instruction 904), board (instruction 908), and exit instructions (e.g., instruction 1002) describing how to navigate to the next transit line when a transfer between transit lines occurs.

In some implementations, placecard 902 can present a navigation instruction 1006 describing how the user can travel to the destination location specified by the user for the current transit route. For example, instruction 1006 can indicate a transportation mode, a distance, and/or an estimated amount of time to reach the destination location. In the example of FIG. 10, instruction 1006 can indicate that the user may walk to the destination location, that the destination location is 0.5 miles away, and that it should take the user about 8 minutes to walk to the destination location.

In some implementations, placecard 902 can present navigation instruction 1008 indicating that the user will arrive, or has arrived, at the destination location after walking from the last transit station to the destination location. For example, instruction 1008 can include an identifier for the destination location (e.g., a name of a business, a street address, a contact name, etc.).

As described above, in some implementations, navigation application 104 can present the navigation instruction corresponding to the current portion of the route being traversed by the user (e.g., by user device 102) at the top of placecard 902. For example, after the user has executed instruction 904, instruction 904 can be removed from placecard 902 and the remaining instructions can be shifted upward with instruction 908 at the top of placecard 902. Likewise, after the user has executed instruction 908, instruction 908 can be removed from placecard 902 and the remaining instructions can be shifted upward with instruction 1002 at the top of placecard 902. This can continue until user device 102 has reached the destination location and instruction 1008 is the only instruction remaining on placecard 902.

In some implementations, the user can select a navigation instruction to be presented at the top of placecard 902. For example, the user may know how to get to the transit station for a selected transit route but the user may want to view the boarding instruction with the transit vehicle information and/or departure schedule. Thus, before the user arrives at the starting (e.g., boarding) transit station, the user may select boarding instruction 908 to cause navigation application 104 to present navigation instruction 908 at the top of placecard 902 even though the user has not yet executed the preceding navigation instructions. As another example, the user may know the transit system portion of the transit route well, but is unsure about how to get from the final transit stop to the destination location. Thus, before the user arrives at the final transit station, the user may select instruction 1006 to cause navigation application 104 to present navigation instruction 1006 at the top of placecard 902 even though the user has not yet executed the preceding navigation instructions. Later, when navigation application 104 determines that the user has performed the user-selected navigation instruction presented at the top of placecard 902, navigation application 104 can continue automatically updating placecard 902 as subsequent navigation instructions are performed, as described above.

Improving User Transit Vehicle Selections

Figure 11:
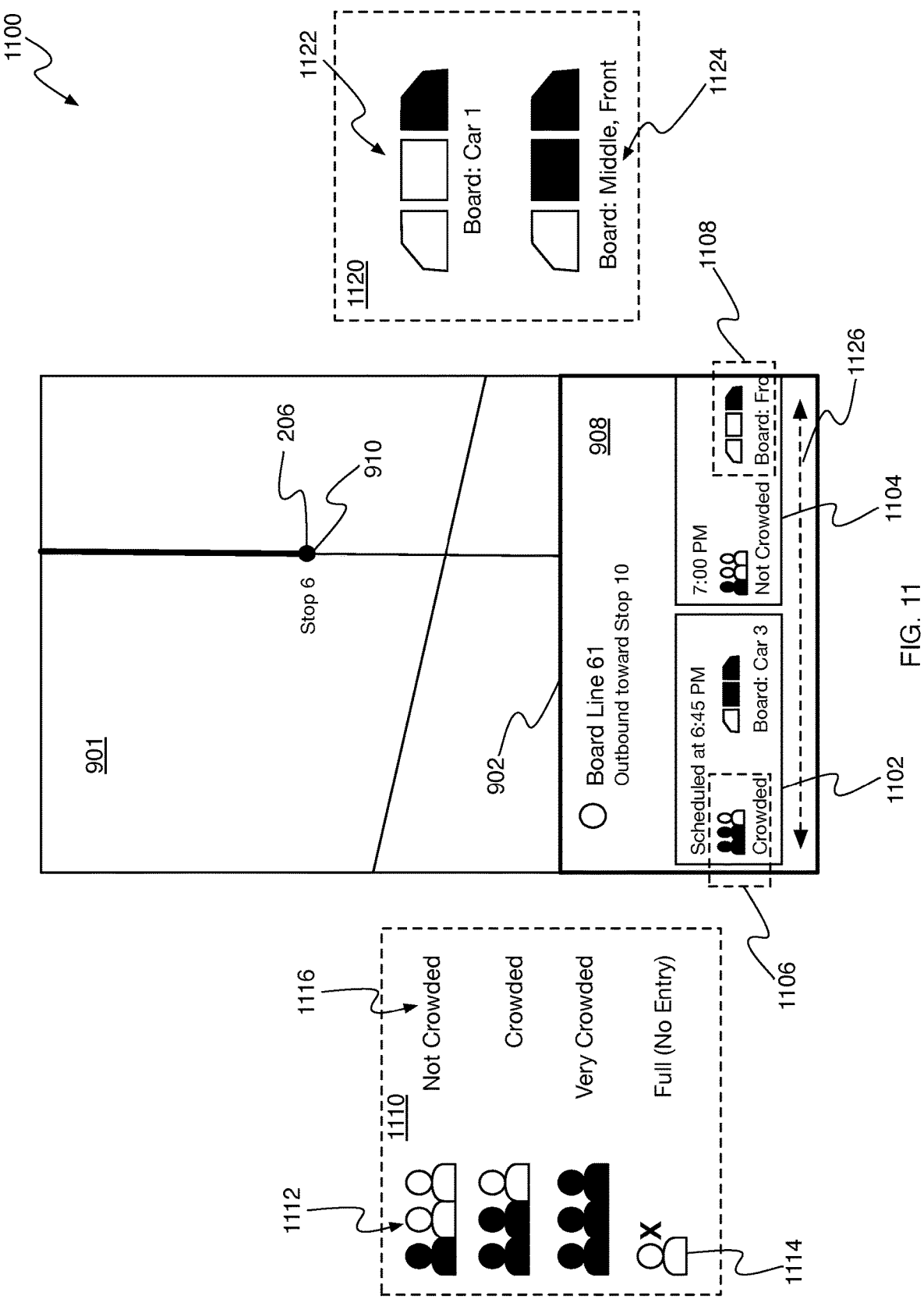
FIG. 11 illustrates an example graphical user interface for presenting information for improving a user's transit vehicle selections.

FIG. 11 illustrates an example graphical user interface 1100 for presenting information for improving a user's transit vehicle selections. For example, navigation application 104 can present occupancy status information and/or vehicle section recommendations that will allow the user to use a transit system more efficiently. In some implementations, the occupancy status information and/or vehicle section recommendations can be presented within the transit line information elements (e.g., elements 416, 418, etc.) of FIG. 4 and/or FIG. 5. In some implementations, the occupancy status information and/or vehicle section recommendations can be presented on a detailed transit line information GUI, such as placecard 802 of GUI 800. For example, graphical elements 810 can be expanded to include occupancy status and/or vehicle section recommendations, as described further below. In some implementations, this information can be presented as part of a boarding instruction (e.g., instruction 908) presented by placecard 902, as illustrated by FIG. 11.

In some implementations, navigation application 104 can present occupancy status information for transit vehicles the user is considering boarding so that the user can adjust their travel plans based on the current occupancy of the transit vehicle. For example, navigation application 104 can receive from transit server 132, through navigation server 112, real-time, and/or near real time, occupancy information for the transit vehicles running on transit lines (e.g., transit systems) associated with transit server 132. In some implementations, navigation application 104 can determine a transit line that the user is interested in (e.g., based on user input selecting a transit line, based on a transit route generated for and/or selected by the user, etc.) and request occupancy information for the transit line.

When navigation application 104 presents scheduling information (e.g., departure times) for the transit line, navigation application 104 can present occupancy information for each of the presented departure times, as illustrated by FIG. 11. For example, transit navigation instruction placecard 902 can present boarding instruction 908. Boarding instruction 908 can identify a transit line that the user should board (e.g., Line 61) and/or departure times (e.g., graphical elements 1102, 1104, etc) for the transit line from a particular transit station (e.g., transit station 206, stop 6). The user can provide input (e.g., a swipe gesture, touch and drag gesture, click and drag mouse input, etc.) to scroll (e.g., represented by dashed line 126) graphical elements 1102, 1104, etc., presented on boarding instruction 908 to view additional or other departure times from stop 6 on transit line 61. In some implementations, navigation application 104 can present occupancy status information 1106 for a particular departure in association with the presented departure time (e.g., within graphical elements 1102, 1104, etc.).

Occupancy status information 1106 can include a graphic or symbol representing the current occupancy status of the transit vehicle corresponding to the departure time and/or a textual description of the current occupancy status. Examples of various occupancy status symbols and descriptions are presented in dashed box 1110. For example, the occupancy status symbols 1112 can include outlines of a number (e.g., 3, 4, 5, etc.) of shapes representing people where the outlines can be filled in with color (e.g., black, red, green, yellow, etc.) based on how full the corresponding transit vehicle is currently. For example, the more filled in the outlines are, the more full the corresponding transit vehicle is. In some implementations, a particular symbol 114 can be presented when the corresponding transit vehicle is full and/or no entry will be allowed. Alternatively, navigation application 104 can use fill colors to represent the occupancy status. For example, green can represent a transit vehicle that is not crowded, yellow can represent a transit vehicle that is crowded, orange can represent a transit vehicle that is very crowded, and red can represent a transit vehicle that is full (e.g., additional passengers cannot enter the transit vehicle).

In some implementations, the occupancy status symbols 1112 and 1114 can be presented with a textual description of the current occupancy status. For example, the occupancy status textual descriptions 1116 can include "not crowded," "crowded," "very crowded," and/or "full (no entry)," among other descriptions.

In some implementations, navigation application 104 can present a vehicle section recommendation for transit vehicles the user is considering boarding based on the user's route and the exits and/or transfers the user needs to make along the transit route. For example, navigation application 104 can present a recommendation that identifies a section of a transit vehicle that allows for the most efficient transfer between transit vehicles and/or most efficient exit from the last transit station on a transit route generated for the user of user device 102. If a front section of a transit vehicle provides the shortest and/or quickest path to boarding another transit vehicle when the user transfers transit lines during a transit trip, then the front section of the transit vehicle can be recommended to the user. If a rear of a transit vehicle provides the shortest and/or quickest path to exiting the last transit station on the user's transit route, then the rear section of the transit vehicle can be recommended to the user. If the user's transit route requires the user to use a particular exit when the last transit station on the user's transit route has multiple stations and the middle section of the transit vehicle provides the shortest or quickest path to the particular exit, then the middle section of the transit vehicle can be recommended to the user.

In some implementations, vehicle section recommendations for transit vehicles can be generated as part of a transit route generated for a user of user device 102. For example, these recommendations can be generated by navigation server 112, and/or navigation application 104 based on transit system information provided by transit server 132 and analyzed by navigation server 112 and/or navigation application 104 when generating a transit route for the user. For example, navigation application 104 and/or navigation server 112 can generate indoor routes within transit stations based on platform and/or exit location data that identifies the locations of the various platforms and/or various exits within a transit station. Navigation application 104 and/or navigation server 112 can obtain information about the lengths, sections, cars, etc., of the various transit vehicles that run on the various transit lines of a transit system that pass through a station from transit server 132. Navigation application 104 and/or navigation server 112 can generate transit vehicle section recommendations for boarding a transit vehicle at a transit station based on which section of a transit vehicle will be closest to a transit station exit and/or transit station platform that the user should navigate to when the user exits the transit vehicle at a subsequent transit station for the next portion of the user's transit route.

In some implementations, navigation server 112 can generate a transit route cooperatively with transit server 132. For example, navigation server 112 can receive a user's transit route request, including starting location and destination location routing parameters, from navigation application 104. Navigation server 112 can send the routing parameters to transit server 132 and transit server 132 can generate the entire transit route from start location to destination location. When generating the transit route, transit server can generate the transit vehicle section recommendations based each transit line transfer and transit station exit along the transit route. For example, the transit vehicle section recommendation for a transit vehicle the user is boarding, or considering boarding, may be based on a subsequent transit line transfer and/or location of subsequent transit station's exit to the outside of the station. Transit server 132 can send the transit route to navigation server 112 and navigation server 112 can send the transit route to navigation application 104 on user device 102 for presentation to the user.

Alternatively, navigation server 112 can send the routing parameters to transit server 132 and transit server 132 can generate the transit system portion of the transit route from a first transit station to a last transit station. When generating the transit system portion of the route, transit server 132 can generate the transit vehicle section recommendations based each transit line transfer and transit station exit along the transit route. For example, the transit vehicle section recommendation for a transit vehicle the user is boarding, or considering boarding, may be based on a subsequent transit line transfer and/or location of subsequent transit station's exit to the outside of the station. Transit server 132 can send the transit system portion of the route to navigation server 112. Navigation server 112 can generate the portions of the transit route for navigating from the current location of user device 102 to the first transit station on the route and for navigating from the last transit station on the route to the destination location. Navigation server 112 can combine the portions of the route generated by navigation server 112 with the portions of the route generated by transit server 132 and send the complete transit route to navigation application 104 on user device 102 for presentation to the user.

When navigation application 104 presents scheduling information (e.g., departure times) for the transit line, navigation application 104 can present vehicle section recommendations for each of the presented departure times, as illustrated by FIG. 11. For example, transit navigation instruction placecard 902 can present boarding instruction 908. Boarding instruction 908 can identify a transit line that the user should board (e.g., Line 61) and/or departure times (e.g., graphical elements 1102, 1104, etc) for the transit line from a particular transit station (e.g., transit station 206, stop 6). The user can provide input (e.g., a swipe gesture, touch and drag gesture, click and drag mouse input, etc.) to scroll (e.g., represented by dashed line 126) graphical elements 1102, 1104, etc., presented on boarding instruction 908 to view additional or other departure times from stop 6 on transit line 61. In some implementations, navigation application 104 can present vehicle section recommendations 1108 for a particular departure in association with the presented departure time (e.g., within graphical elements 1102, 1104, etc.).

Vehicle section recommendations 1106 can include a graphic or symbol representing the sections of the transit vehicle corresponding to the departure time and/or a textual description of the vehicle section recommendation. Examples of various vehicle section recommendation symbols and descriptions are presented in dashed box 1120. For example, the vehicle section recommendation symbols 1122 can include outlines of a number (e.g., 3, 4, 5, etc.) of shapes representing sections of a transit vehicle where the outlines can be filled in with color (e.g., black, red, green, yellow, etc.) to indicate which sections of the vehicle are recommended or not recommended for the user's current transit route and/or terminal transit station. For example, filled in transit vehicle section outlines can indicate recommended transit vehicle sections while empty transit vehicle sections can indicate non-recommended transit vehicle sections. Alternatively, navigation application 104 can use fill colors to represent the vehicle section recommendations. For example, green can represent a transit vehicle sections that are recommended and red can represent transit vehicle sections that are not recommended.

In some implementations, the vehicle section recommendation symbols 1122 can be presented with a textual description 1124 of the vehicle section recommendation. For example, vehicle section recommendation textual descriptions 1124 can indicate a section of the transit vehicle in relative terms (e.g., front, middle, rear, back, etc.). Vehicle section recommendation textual descriptions 1124 can indicate a section of the transit vehicle in absolute terms (e.g., by identifying a specific car or cars, vehicle door or doors, departure gate, etc.). For example, when the transit vehicle is a train with multiple cars, the vehicle section recommendation textual descriptions 1124 can identify a specific car of the transit vehicle.

In some implementations, boarding instruction 908 can indicate a current location of a transit vehicle to be boarded by the user before the user has boarded the transit vehicle. For example, as the user is waiting at a transit station to board the transit vehicle selected for the user's transit route, navigation application 104 can present and/or update the current location of the transit vehicle so that the user can track the progress of the transit vehicle as the transit vehicle approaches the transit station where the user is waiting to board the transit vehicle. For example, navigation application 104 can indicate the current location of the transit vehicle by presenting an identifier for the most recent transit station that the transit vehicle has visited (e.g., stopped at, moved past, etc.). This allows the user to track the transit vehicle as the transit vehicle moves from transit station to transit station approaching the transit station where the user is waiting to board the transit vehicle.

In some implementations, navigation application 104 can present the current location of the transit vehicle the user is waiting to board on map 901. For example, navigation application 104 can present a graphical element on map 901 representing the current location of the transit vehicle as it approaches the current location of user device 102 while the user is waiting at the boarding transit station. The current location of the transit vehicle can be determined based on the most recent transit station visited by the transit vehicle. The current location of the transit vehicle can be determined based on real-time, or near real-time, location data for the transit vehicle (e.g., provided by the corresponding transit system). While the user is waiting at the boarding transit station (e.g., stop 6, station 910), navigation application 104 can adjust the map 901 to frame the current location of user device 102 and the current location of the transit vehicle in the map view so that the user can monitor the progress of the transit vehicle as it approaches the user's current location.

Figure 12:
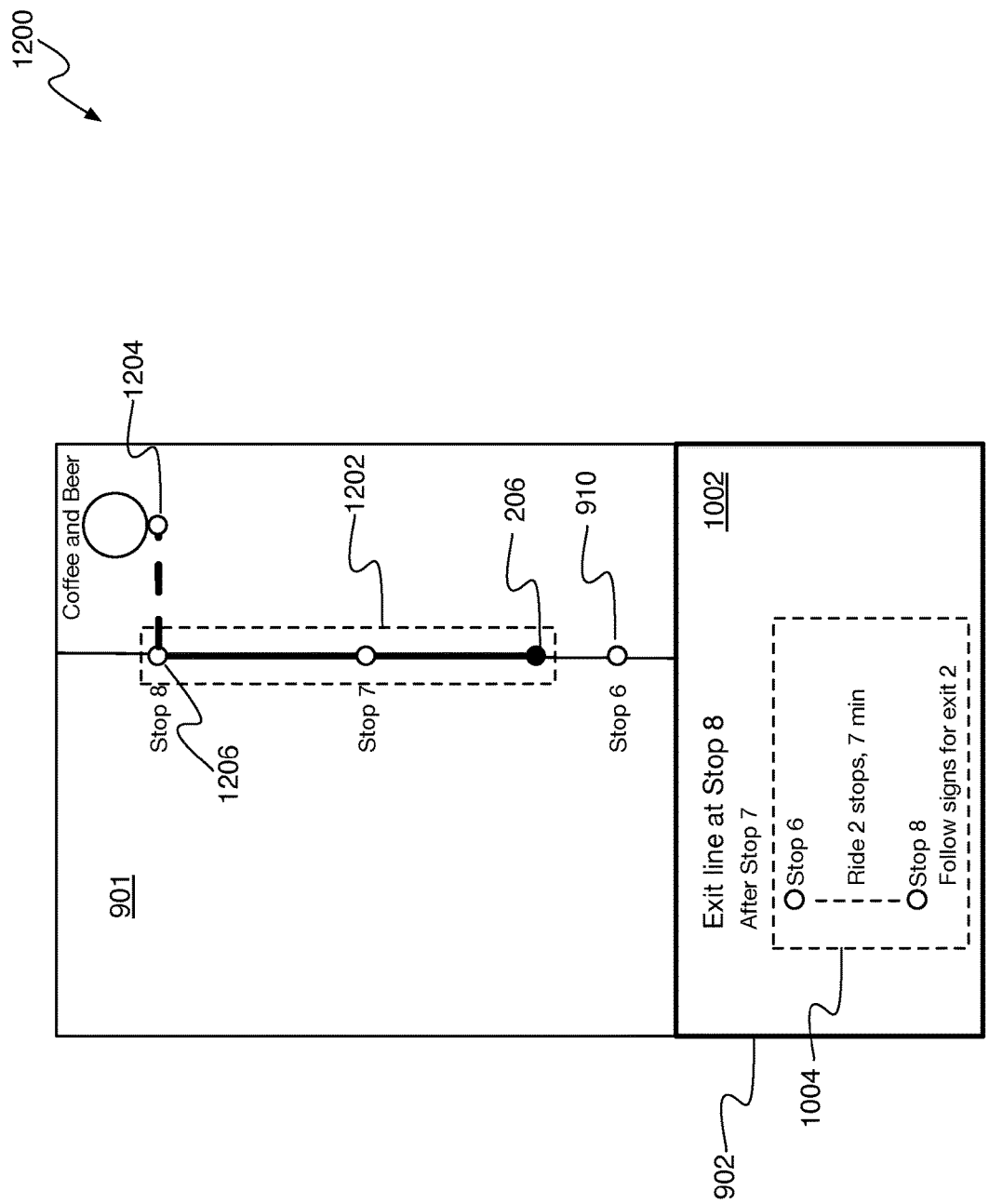
FIG. 12 illustrates an example graphical user interface for presenting a transit system portion of a transit route generated for a user.

FIG. 12 illustrates an example graphical user interface 1100 for presenting a transit system portion of a transit route generated for a user of user device 102. For example, after the user (e.g., user device 102) has boarded a transit vehicle at a transit station (e.g., stop 6), navigation instruction placecard 902 can present navigation instruction 1002 that describes the transit system portion (e.g., transit portion overview 1004) of the transit route and instructs the user to exit the line at the last transit station on the route (e.g., terminal transit station). Navigation application 104 can determine that the user has boarded the transit vehicle when user device 102 has moved a distance away from the transit station along the transit line, as indicated by current location indicator 206. Navigation application 104 can determine the current location of user device 102 using various location determining systems, such as a global positioning satellite system, cellular data positioning systems, Wi-Fi signal mapping, and/or other location systems.

In some implementations, navigation application 104 can frame the transit system portion of the transit route on map 901 in the visible portion of the map view of GUI 1200. For example, when the user boards a transit vehicle and/or when the user device arrives at the first transit station 910, navigation application 104 can arrange map 901 such that the entire transit system portion 1202 of the transit route (e.g., from the first transit station 910 to the last transit station 1206) is presented on GUI 1200 thereby providing the user with an overview of the transit system portion of the transit route. Alternatively, navigation application 104 can arrange map 901 such that the transit system portion 1202 of the transit route from the current location of user device 102 to the last transit station 1206 on the user's route is presented on GUI 1200 (e.g., framed at near the center of GUI 1200) thereby providing the user with an overview of the remaining portion of the transit system portion of the transit route. Navigation application 104 can update the user's location on map 901 in real time, or near real time, as user device 102 moves along the transit line so that the user can track the user's progress along the transit system portion of the transit route. Navigation application 104 can update the graphical representation (e.g., bold line, dashed line, colored line, etc.) of the transit route from the current location of user device 102 to the destination location 1204 on map 901 in real time, or near real time, as the current location of user device 102 changes along the transit line.

In some implementations, navigation application 104 can present an exit location for the final, or terminal, transit stop on the user's transit route. For example, as the current location of user device 102 approaches transit stop 8 (e.g., transit station 1206), navigation application 104 can adjust the zoom level of the map view to frame the portion of the user's transit route from the current location of user device 102 to the final transit station 1206 in the map view. When navigation application 104 determines that a threshold zoom level has been crossed (e.g., the map has been zoomed in enough to view details or outline of the transit station and surrounding streets), navigation application 104 can present a graphical element on the map indicating a recommended exit at the final transit station 1206. The recommended exit can be selected based on which transit station exit provides the shortest or quickest route to the destination location specified for the user's transit route, for example. The transit station exit location can be received as part of the route data provided by navigation server 112.

Presenting Alight Notifications

Figure 13:
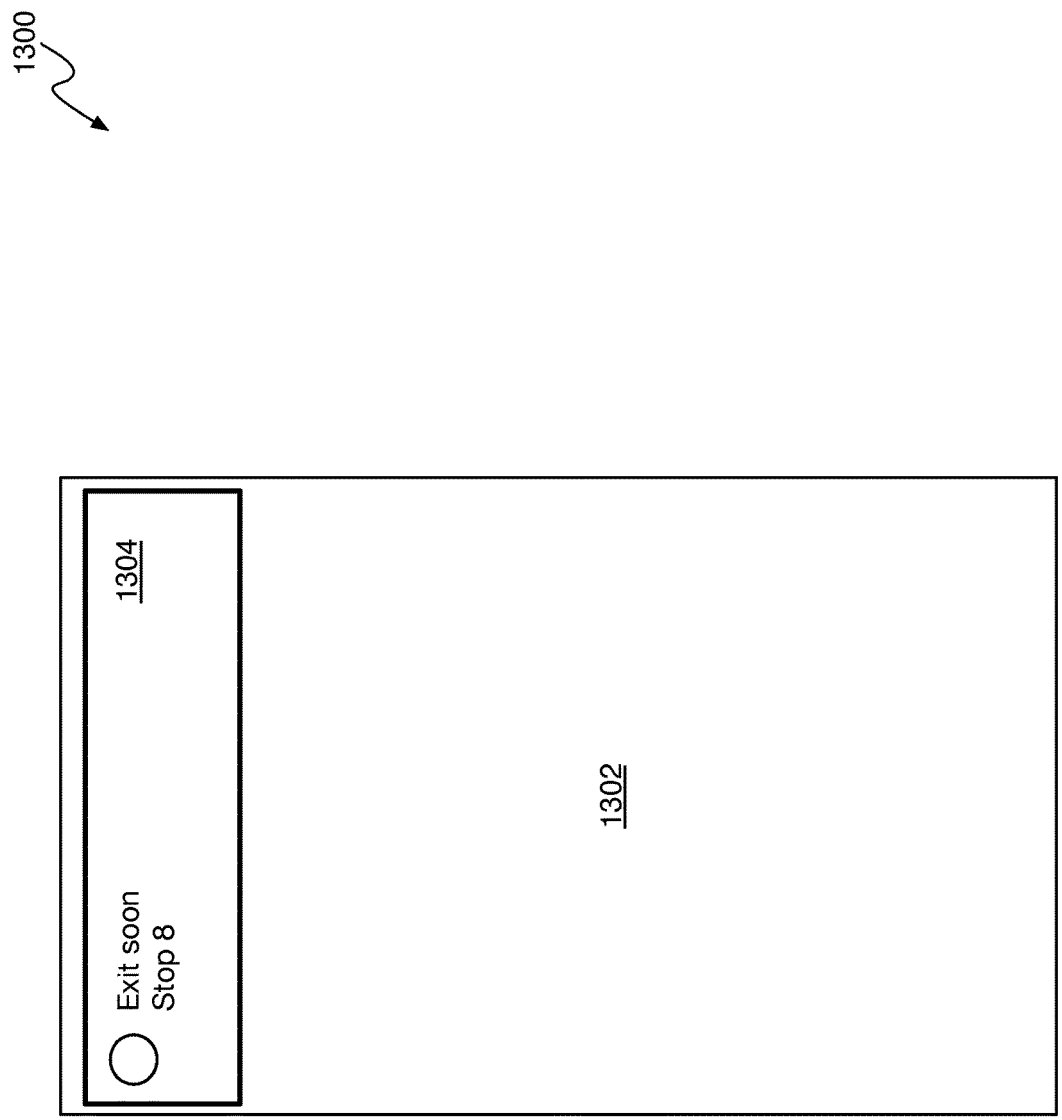
FIG. 13 illustrate an example graphical user interface for presenting an alight notification.

FIG. 13 illustrate an example graphical user interface 1300 for presenting an alight notification. For example, alight notification 1304 can be presented by navigation application 104 on a display associated with user device 102 as user device 102 approaches the last transit station (e.g., transit station 1206) on a transit route or when the user approaches a transit station where the user needs to transfer from one transit line to another transit line. Stated simply, alight notification 1304 can be presented whenever user device 102 is approaching a transit station where the user must exit the transit vehicle (e.g., transit line) on which the user is currently travelling. Alight notification 1304 can present text and/or graphical elements warning the user that the user must exit the current transit vehicle and/or transit line soon. In some implementations, alight notification 1304 can identify the transit station where the user should exit (e.g., stop 8) the current transit vehicle and/or transit line.

In some implementations, alight notification 1304 can be presented when the navigation application 104 is running as a background application or process on user device 102. For example, navigation application 104 can be considered a background application or process when the user is currently interacting with a different application (e.g., different application GUI 1302) on user device 102. Navigation application 104 can be considered a background application or process when a graphical user interface of navigation application 104 is not currently presented on a display of user device 102 (e.g., when navigation application 104 is hidden, minimized, the display is turned off, or user device 102 is locked). In some implementations, alight notification 1304 can be presented graphically on a display of user device 102. For example, if the display is turned off, presentation of alight notification 1304 can cause the display to be turned on. Alight notification 1304 can be presented audibly (e.g., using an alarm sound, ring tone, or other noise). Alight notification 1304 can be presented haptically (e.g., by vibrating user device 102). In some implementations, various combinations of a graphic, audible, and haptic alight notifications can be presented by navigation application 104.

In some implementations, presentation of alight notification 1304 can be triggered when user device 102 moves within a threshold distance (e.g., 1000 feet, 2000 feet, 0.5 miles, etc.) of a transit station where the user should exit the current transit vehicle and/or transit line. For example, when navigation server 112 generates the transit route for the user, navigation server 112 can analyze the transit route to determine transit stations where the user should transfer between transit lines and/or exit the transit system. For example, when a transit route is composed of multiple transit lines or transit vehicles (e.g., at least one transit line transfer), each transit line can be referred to as a transit leg. Navigation server 112 can configure alight notification geofences for the determined transit stations (e.g., each transit leg) such that when navigation application 104 detects that user device 102 has entered an alight notification geofence, navigation application 104 can present alight notification 1304. For example, navigation application 104 can receive information defining the geofences from navigation server 112 as part of the transit route data generated by navigation server 112.

In some implementations, navigation server 112 may generate multiple transit route options when generating a transit route for the user of user device 102. For example, there may be multiple transit lines and/or transit vehicles that can take a user from a starting transit station to a final transit station on the transit system portion of the transit route. These different transit lines and/or transit vehicles can be included in the route data and presented to the user by navigation application 104 so that the user can select between different transit options when traversing the transit route. When multiple transit options are generated for the user's transit route, navigation server 112 can generate multiple geofences for the various transit options (e.g., for each transit station where a transfer or exit may occur) so that an alight notification can be presented at the appropriate time or location no matter which transit option the user selects for traversing the transit system portion of the user's transit route. When navigation application 104 presents an alight notification in response to entering or exiting a geofence, the corresponding geofence can be deleted so that the same geofence will not trigger duplicative alight notifications.

In some implementations, alight notification geofences can be located at various locations with respect to a transit station (e.g., an alight transit station) where the user will transfer transit lines or exit a transit system. For example, an alight notification geofence can be centered on an alight transit station and have radius sized to provide an alight notification a number of minutes (e.g., 3, 5, 7, etc.) prior to the user's arrival at the alight transit station. Several alight notification geofences can be placed around on an alight transit station to provide more contoured coverage of the footprint of the alight transit station and each geofence can have radius sized to provide an alight notification a number of minutes (e.g., 3, 5, 7, etc.) prior to the user's arrival at the alight transit station. An alight notification geofence can be centered on the transit line on which the user is travelling and at a distance from the alight transit station between the alight transit station and a preceding transit stop on the user's transit route. An alight notification geofence can be centered on a transit stop immediately preceding the alight transit station. In each case, the alight notification geofence can be sized (e.g., geofence radius adjusted) so that the alight notification is presented a number of minutes before the user is expected to arrive at the alight transit station.

In some implementations, the location where an alight notification geofence is centered can be selected based on various criteria. For example, navigation server 112 can select the location for placing an alight notification geofence based on the signal environment around various candidate locations. For example, if a transit station (e.g., the alight transit station, preceding transit station, etc.) has a weak signal environment (e.g., weak reception of satellite signals, Wi-Fi signals, cellular signals, etc.), navigation application 112 can select an alternate location (e.g., between transit stations) that has a stronger signal environment. Navigation server 112 can select the location for placing (e.g., centering) an alight notification geofence based on the distance between transit stops. For example, if the transit station preceding the alight transit station is less than or equal some threshold amount of time (e.g., 5 minutes, 10 minutes, etc.) away from the alight transit station, then navigation server 112 can center the alight notification geofence on the preceding transit station. However, if the transit station preceding the alight transit station is 15 minutes away from the alight transit station, then navigation server can center the alight notification geofence on the alight transit station or at some location on the transit line between the alight transit station and the preceding transit station.

In some implementations, navigation application 104 can present an alight notification when user device 102 enters or exits an alight geofence. For example, the alight geofence definition received from navigation server 112 can indicate whether navigation application 104 should present the alight notification upon entering or upon exiting the alight notification geofence and/or the timing (e.g., delay) of when to present the alight notification relative to entering or exiting a geofence. When the alight notification geofence is centered on the alight transit station, navigation application 104 may be configured to present the alight notification when user device 102 enters the geofence. When the alight notification geofence is centered on a transit station preceding the alight transit station, navigation application 104 may be configured to present the alight notification when user device 102 exits the geofence. However, when the transit duration between the alight transit station and the preceding transit station is less than or equal to a threshold period of time (e.g., 5 minutes, 10 minutes, etc.), navigation application 104 can be configured to present the alight notification when the user enters an alight notification geofence around the preceding transit station.

In some implementations, the alight notification geofence definition received from navigation server 112 can indicate an amount of time that navigation application 104 should delay presenting the alight notification after user device 102 has entered or exited a geofence. The delay can be calculated as some fraction (e.g., 1/2, 2/3, 3/4, etc.) of the travel duration between stops. The delay can be calculated based on an amount of time in advance of the alight transit station. For example, if the final two stops of a route are three hours travel apart from each other, navigation server 112 can indicate in the alight notification geofence definition that navigation application 104 should present the alight notification for the alight transit station two hours and thirty minutes after exiting a geofence around the preceding transit station thereby giving the user about 30 minutes notice in advance of the user's arrival at the alight transit station.

Figure 14:
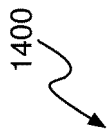
FIG. 14 illustrates and example graphical user interface for presenting a low signal environment warning for a transit station.

FIG. 14 illustrates and example graphical user interface 1400 for presenting a low signal environment warning for a transit station. For example, graphical user interface 1400 can be presented by navigation application 104 when the signal environment around a transit station may prevent navigation application 104 from presenting an alight notification. As described above, navigation application 104 may present an alight notification when user device 102 enters a geofence around a transit station. However, some transit stations may be located in a low signal environment (e.g., underground) that prevents user device 102 from receiving electronic signals (e.g., satellite signals, cellular tower signals, Wi-Fi signals, etc.) that can be used to determine the current location of user device 102. Thus, in low signal environments, navigation application 104 may not be able to determine or detect when user device 102 has entered a geofence configured for a corresponding transit station (e.g., a final transit station in a transit route, a transit station where the user should transfer between transit lines).

When navigation application 104 obtains, or generates, a transit route for a user, navigation application 104 can configure a geofence around a transit station. When configuring the geofence, navigation application 104 can determine whether the corresponding transit station is located within a low signal environment. For example, navigation application 104 can determine whether the corresponding transit station is located in a low signal environment based on transit map data, transit infrastructure data, transit route data, etc., received from navigation server 112 that identifies whether a transit station is located within a low signal environment. When navigation application 104 determines that the transit station for which a geofence is configured is within a low signal environment, navigation application 104 can present notification 1404 that warns the user about the low signal environment and informs the user than an alight notification may not be presented.

In some implementations, low signal environment notification 1404 can be presented at the beginning of the transit system portion of the transit route. When the transit system portion of the transit route includes a transfer between transit lines, low signal environment notification 1404 can be presented when the user boards a vehicle of a transit line where the user will exit the boarded transit line in a low signal environment.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 15:
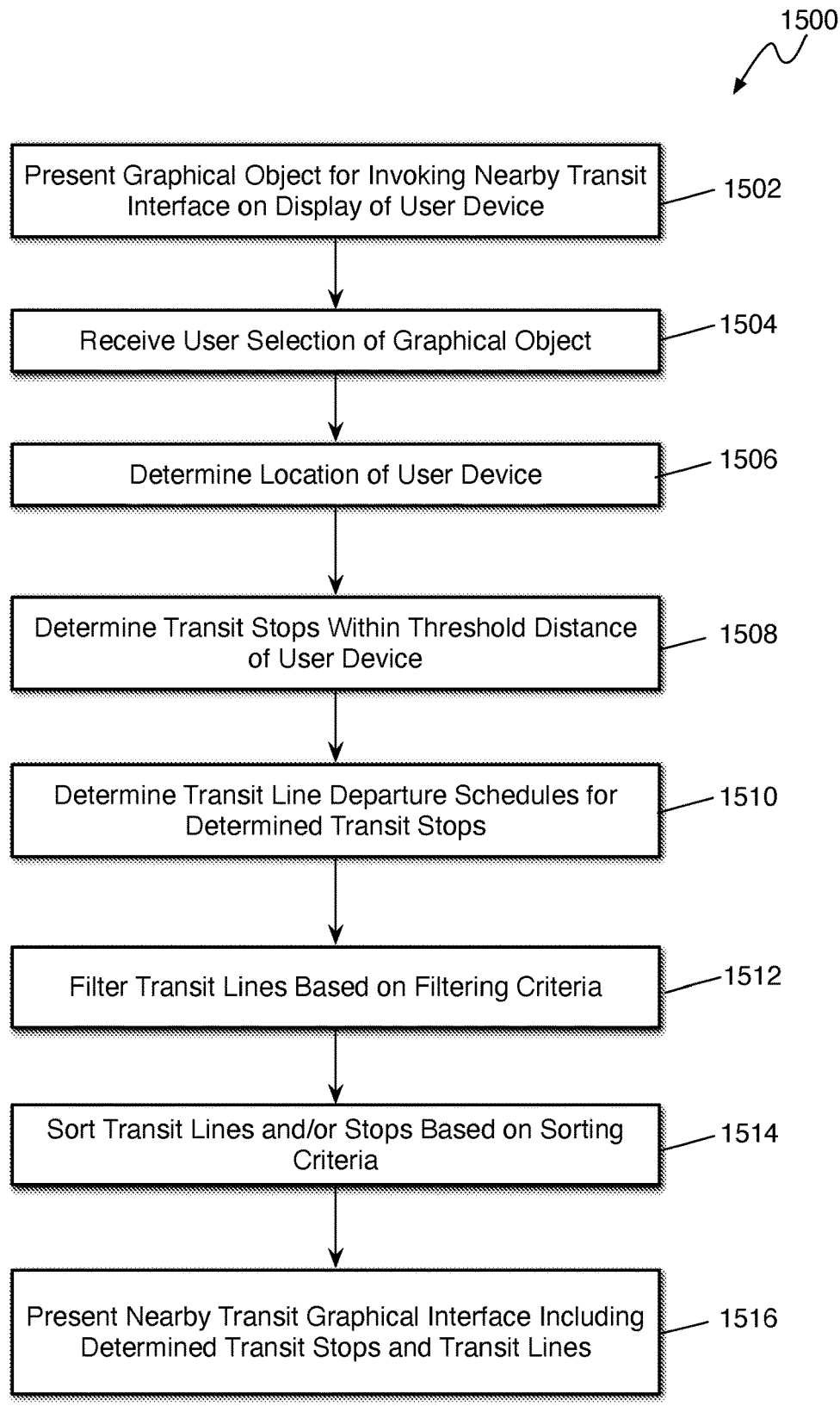
FIG. 15 is flow diagram of an example process for presenting nearby transit options.

FIG. 15 is flow diagram of an example process 1500 for presenting nearby transit options. For example, process 1500 can be performed by navigation application 104 on user device 102 to present nearby transit options on a display of user device 102. This nearby transit feature of navigation application 104 can allow the user to select a transit option more quickly and efficiently for an imminent transit trip where the user may not need navigation instructions for an entire transit route. For example, the user may be familiar with the local transit systems in general but may need quick information about transit departures within the near future (e.g., the next 15 minutes, 30 minutes, 1 hour, etc.).

While the description of the nearby transit feature herein focuses on graphical user interfaces, graphical objects, and user input with respect to these graphical elements, the nearby transit feature of navigation application 104 can be invoked using voice input to user device 102. For example, the user can issue a voice command to user device 102 by speaking "show nearby transit options" or some other command indicating the user's wish to be presented nearby transit options. In response to the voice command, user device 102 and/or navigation application 104 can present, graphically or audibly, information describing the nearby transit options, as described above and below.

In some implementations, navigation application 104 can automatically present nearby transit options without requiring the user to provide input invoking the nearby transit options feature. In the automatic case, process 1500 may start at step 1506.

At step 1502, user device 102 can present a graphical object for invoking a nearby transit graphical user interface on a display of user device 102. For example, the graphical object can be a button, link, or other affordance presented on a graphical user interface generated by navigation application 104, such as graphical object 302 of FIG. 3.

At step 1504, user device 102 can receive user input selecting the nearby transit graphical object. For example, navigation application 104 can receive user input indicating that the user wishes to view transit option located nearby user device 102.

At step 1506, user device 102 can determine the current location of user device 102. For example, navigation application 104 can determine the current location of user device 102 in response to receiving the user input at step 1504. Navigation application 104 can obtain the current location of user device 102 from location determining subsystems that use signals (e.g., radio signals) received by the location determining subsystems of user device 102. These location determining subsystems can, for example, determine the current location of user device 102 based on signals from global positioning satellite systems, cellular data systems, Wi-Fi systems, and/or other signal generating systems that can be mapped to specific geographies.

At step 1508, user device 102 can determine transit stops within a threshold distance of user device 102. For example, navigation application 104 can be configured with a threshold distance for determining nearby transit stations. The threshold distance can be a default value or user specified value, as described above. Navigation application 104 can determine the distance between the current location of user device 102 and locations of transit stations identified in transit map data received by navigation application 104. Navigation application 104 can compare the determined distance to each transit station to the threshold distance to determine which transit stations are within the threshold distance of user device 102.

Alternatively, navigation application 104 can send the current location of user device 102 and the threshold distance to navigation server 112. Navigation server 112 can determine which transit stations are within the threshold distance of the current location of user device 102 and send a list of transit stations and corresponding transit station data (e.g., distance from user device 102, location, transit lines served, transit line departure schedule, etc.) for each nearby transit station to navigation application 104.

At step 1510, user device 102 can determine transit line departure schedules for the determined nearby transit stations. For example, navigation application 104 can obtain the departure schedules for each nearby transit station from navigation server 112.

At step 1512, user device 102 can filter transit lines based on various filtering criteria. For example, navigation application 104 can filter transit lines, transit stops, transit departures and/or combinations of lines, stops, and/or departures based on various criteria. In some implementations, the filtering criteria can be applied to entire transit lines (e.g., through multiple stops) and/or entire transit stations (e.g., across multiple transit lines). In some implementations, the filtering criteria can be applied to specific transit station/transit line combinations.

In some implementations, the transit line filtering criteria can include time of departure. For example, transit lines that do not have departures scheduled within a threshold period of time (e.g., the departure threshold mentioned above) may be filtered out (e.g., removed) from the list of nearby transit options. Filtering out transit lines may result in some transit stations being filtered out. For example, if a transit station services only one transit line and that one transit line does not have a departure within the threshold period of time, then the transit station may be filtered out from the list of nearby transit options.

In some implementations, the transit line filtering criteria can include occupancy status. For example, if transit vehicles on a transit line are at or near maximum occupancy, then the transit departures corresponding to these transit vehicles may not be considered when determining nearby transit options. If all transit vehicles of a particular transit line that have departures within the departure threshold window are at maximum capacity, then the corresponding transit line may be filtered out of the nearby transit options due to the fact that the user may not be able to get on one of these transit vehicles.

In some implementations, transit line filtering criteria can include service disruptions detected on a transit line (e.g., maintenance, accidents, etc.). For example, transit lines that are currently not in service can be filtered out of the list of nearby transit options. Transit line filtering criteria can include the popularity of the transit line and/or corresponding transit station. For example, a transit line that has a popularity below a threshold popularity value can be filtered out from the nearby transit options. Transit line filtering criteria can include crime statistics related to a transit line and/or corresponding transit station. For example, transit lines and/or transit stations can be filtered out when a value representing the amount of crime, types of crime, and/or severity of crime (e.g., murders vs. assault vs. theft, etc.) exceeds a threshold value that indicates the corresponding transit line and/or transit station is unsafe. Transit line filtering criteria can include other filtering criteria, as may be described in other examples within this disclosure. Each of the criteria and/or corresponding thresholds may be defined by default values and/or adjusted by the user to fit the user's needs.

At step 1514, user device 102 can sort transit lines and/or transit stops based on various sorting criteria. For example, navigation application 104 can sort transit lines and/or transit stops for presentation on a graphical user interface (e.g., placecard 410) of navigation application 104 based on various sorting criteria that may make it easier for the user to quickly find a suitable transit line for an upcoming transit trip. Navigation application 104 can sort transit stations, transit lines, transit departures, and/or a combination thereof based on the various sorting criteria described herein. For example, navigation application 104 can sort transit stations, transit lines within transit station groupings, transit departures within transit line groupings and/or combinations of lines, stations (e.g., stops), and/or departures based on the various sorting criteria described herein.

In some implementations, the sorting criteria can include whether a transit line has been pinned by the user of user device 102. For example, navigation application 104 can sort transit stations, transit lines, and/or departures based on whether the user has previously pinned a transit station, transit line, or departures. Pinned transit items can be presented at a prominent location (e.g., at the top of a GUI, in a special section of a GUI, at the top of a grouping or list, etc.) on a GUI of navigation application 104, as illustrated by FIG. 7. For example, if a user has previously pinned a particular transit line associated with a particular stop, then the pinned transit line can be presented at the top of the transit line listing for the particular stop. If a transit stop is associated with a pinned transit line, the transit stop, along with the transit line, may be presented at the top of a list of transit stops when presented on a GUI (e.g., placecard 410) of navigation application 104.

In some implementations, the sorting criteria can include the distance between user device 102 and a transit station that services a transit line and/or transit departure. For example, navigation application 104 can determine the distance between the current location of user device 102 and the various transit stations that are within the nearby transit threshold distance. Navigation application 104 can sort the transit stations based on the determined distances between the current location of user device 102 and the nearby transit stations. For example, when presenting the nearby transit stations, navigation application 104 can present the closest transit stations toward the top of a listing of nearby transit stations and transit stations that are farther away from the user toward the bottom of the listing of nearby transit stations.

In some implementations, the sorting criteria can include the identifier for the nearby transit stations and/or transit lines. For example, navigation application 104 can sort the nearby transit stations alphabetically based on the name and/or identifier of the transit station to make it easier for the user to browse or scroll through a listing of transit stations to find a particular transit station in which the user is interested. Navigation application 104 can sort transit lines presented within a transit station line grouping (e.g., a list of transit lines associated with a particular transit station) alphabetically based on the name and/or identifier of the transit line to make it easier for the user to browse or scroll through a listing of transit lines to find a particular transit line in which the user is interested.

In some implementations, the sorting criteria can include the timing of departures on a transit line at a corresponding transit stop. For example, transit stops, transit lines, and/or transit departures can be sorted by navigation application based in the timing of departures from each nearby transit station. Transit stops having earlier departure times can be presented higher on a list of transit stops than transit stops having later departure times. Transit lines having earlier departure times can be presented higher on a list of transit lines (e.g., within a list of transit lines for a particular stop) than other transit lines having later departure times. Transit departures having earlier departure times can be presented higher on a list of departure times (e.g., within a list of transit departures for a particular transit line) than other departures having later departure times.

In some implementations, the sorting criteria can include the popularity of a transit line at a corresponding transit stop. For example, the popularity of a transit station, transit line, transit line departure, etc., can be based on the behavior and/or feedback of a particular user (e.g., the user of user device 102) or based on the behavior and/or feedback of a general population of users that use the various transit systems presented by user device 102. Like the examples above, transit information for transit stops, transit lines, departures, etc., can be sorted such that more popular transit stops, transit lines, departures, etc., are presented toward the top of a list or GUI while less popular transit stops, transit lines, etc., are presented toward the bottom of a list or GUI, such as placecard 410 described above.

At step 1516, user device 102 can present a graphical user interface that presents nearby transit options, including nearby transit stations, transit lines, and/or departure times. For example, navigation application 104 can present GUIs 400, 500, 600 and/or 700, described above, that presents nearby transit stops, transit lines, transit line departures, etc., that are filtered and/or sorted according to the criteria described above.

Figure 16:
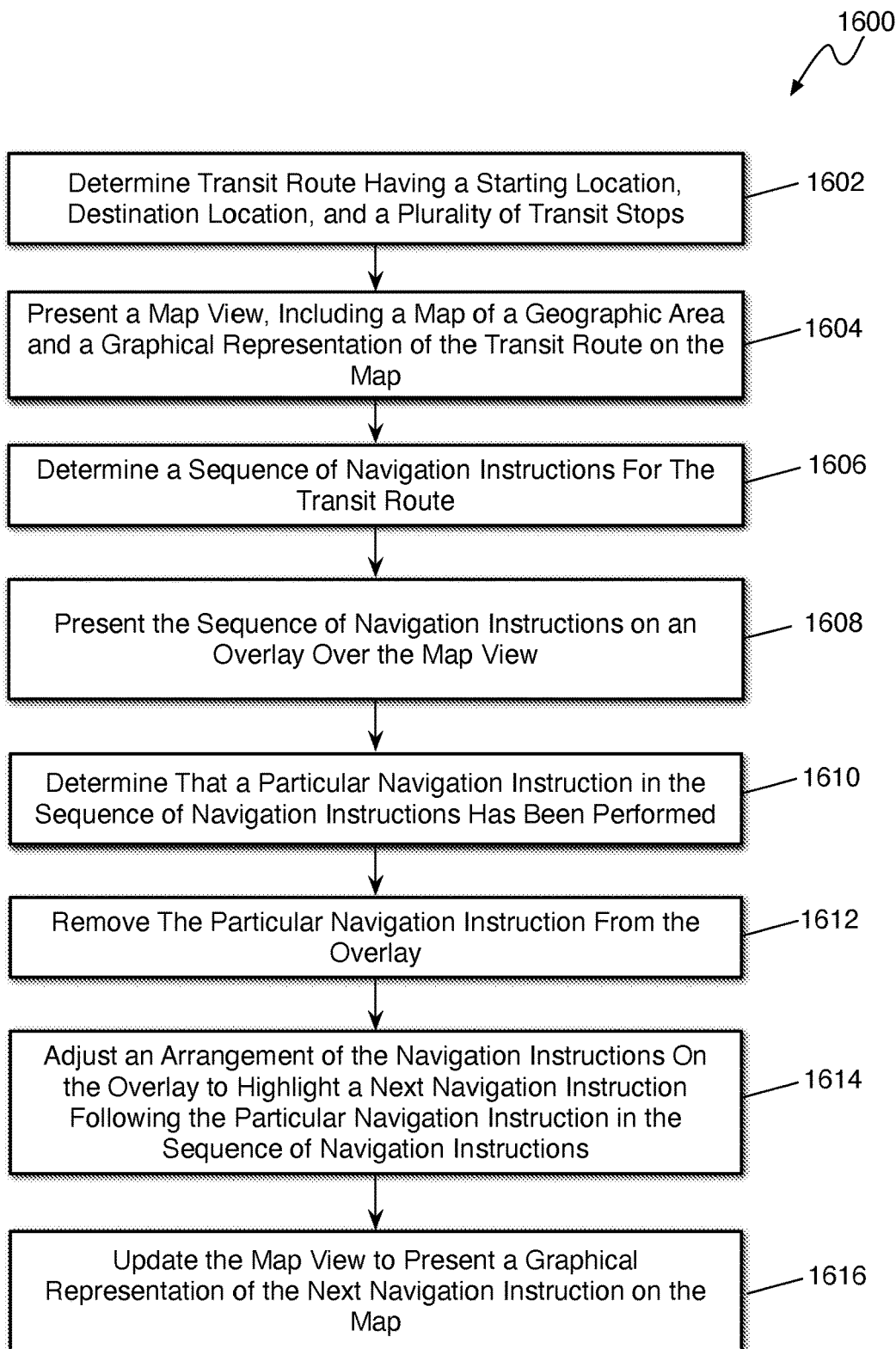
FIG. 16 is a flow diagram of an example process for presenting navigation instructions.

FIG. 16 is a flow diagram of an example process 1600 for presenting navigation instructions. For example, process 1600 can be performed by navigation application 104 on user device 102 to present navigation instructions for navigating a transit route generated for a user of user device 102. The transit route can, for example, be generated by navigation application 104, navigation server 112, and/or transit server 132. Navigation application 104 can present instructions for the user's generated transit route on a display associated with user device 102, as described above with reference to the figures above (e.g., FIG. 9 through FIG. 12) and in the paragraphs below.

At step 1602, user device 102 can determine a transit route having starting location, destination location and a plurality of transit stops. For example, navigation application 104 can receive user input identifying a starting location and/or destination location for a transit trip that the user would like to take. In some cases, the starting location may be the current location of user device 102 and may be automatically determined by navigation application 104 using location determining subsystems of user device 102. Navigation application 104 can send the starting location and destination location to navigation server 112. Navigation server 112 can generate (e.g., in cooperation with transit server 132 or based on transit data received from transit server 132) a transit route based on the starting location and destination location. Navigation server 112 can send the generated transit route to navigation application 104 for presentation to the user of user device 102. The generated transit route can include transit route data, transit schedules, transit infrastructure data, navigation instructions, and/or anything else navigation application 104 needs to present the transit route and navigation instructions to the user of user device 102. In some implementations, navigation application 104 may have already cached the transit data for a local geographic area. Thus, navigation application 104 may, in some cases, generate the transit route locally on user device 102.

At step 1604, user device 102 can present a map view, including a map of a geographic area and a graphical representation of the transit route on the map. For example, navigation application 104 can generate a graphical user interface for presenting a transit route that includes a map view. The map view can include a map of the geographic area where the navigation of the transit route will be performed and a graphical representation of the transit route on the map. The graphical representation of the transit route can be a line, or lines, for example, that trace a route from the starting location to the destination location. The lines can be highlighted using thicker lines, colored lines, dashed lines, or other graphical affects to distinguish the transit route from other graphical objects presented on the map. The graphical representation of the transit route can indicate, or identify, transportation modes (e.g., dashed line for walking, solid line for transit system, etc.). The graphical representation of the transit route can indicate, or identify, important locations along the transit route, such as the current location of user device 102, locations of transit stations along the transit route, the destination location, etc.

At step 1606, user device 102 can determine a sequence of navigation instructions for the transit route. For example, navigation application 104 can determine or generate instructions describing portions of the transit route related to 1) traveling from the user's current location to the transit station where the user will board a transit line, 2) boarding a transit vehicle at the transit station, 3) exiting the transit vehicle, 4) traveling from the transit station where the user exits the transit vehicle to the destination location, and 5) arrival at the destination. In some cases, navigation application 104 may include multiple boarding and exiting instructions when there are transfers between lines while traversing the transit route generated for the user, as described above with reference to FIG. 9 through FIG. 12.

At step 1608, user device 102 can present the sequence of navigation instructions on a navigation instruction overlay over the map view. For example, navigation application 104 can present a placecard overlaid over a portion of the map view. Navigation application 104 can present the sequence of instructions on the placecard. Navigation application 104 can, for example, present the navigation instructions in order of execution starting at the top of the placecard. A user can provide input to manipulate the placecard and cause navigation application 104 to present the placecard at different sizes and/or locations over the map view so that the user can view more or fewer navigation instructions on the display of user device 102.

At step 1610, user device 102 can determine that a particular navigation instruction in the sequence of navigation instructions has been performed. For example, navigation application 104 can determine that user device 102 is located at the transit station where the user will board a transit line but that user device 102 has not yet started moving along the transit line. Thus, navigation application 104 can determine that the user has performed the first portion of the transit route (e.g., walk to transit station) but has not yet performed the second portion of the transit route (e.g., boarded the transit line).

At step 1612, user device 102 can remove the particular navigation instruction from the navigation instruction overlay. For example, as navigation instructions are completed by the user of user device 102, navigation application 104 can remove the completed navigation instructions from the navigation instruction placecard.

At step 1614, user device can adjust the arrangement of the navigation instructions on the navigation instruction overlay. For example, navigation application 104 can adjust the positions of the remaining navigation instructions not yet performed by the user so that the next navigation instruction in the sequence of navigation instructions can be highlighted at the top of the navigation instruction placecard. Having the next navigation instruction located at the top of the navigation placecard is especially useful when the user is viewing the mid-screen version of the navigation placecard (e.g., as illustrated by FIG. 9, FIG. 11, and FIG. 12) so that the user can view the textual instruction for the next portion of the transit route (e.g., instead of viewing an already performed instruction) and the map simultaneously while navigating the transit route.

At step 1616, user device 102 can update the map view to present a graphical representation of the next navigation instruction on the map. For example, navigation application 104 can orient the map such that the transit route presented on the map is oriented in the direction the user is travelling (e.g., in contrast to a static north/south orientation) for the next portion of the transit route. As another example, navigation application 104 can adjust the map to frame the transit system portion of the transit route in the middle of the map view so that the user can view the user's progress along the transit system portion of the route. For example, navigation application 104 can adjust the zoom level of the map, pan the map, and/or rotate the map to frame the transit system portion of the map in the middle of the visible portion of the map view on the display of user device 102. A high level overview presentation of the transit route, rather than a low level turn by turn presentation of the transit route, may be more useful to the user since the user will likely not require turn by turn directions while riding the transit system.

Figure 17:
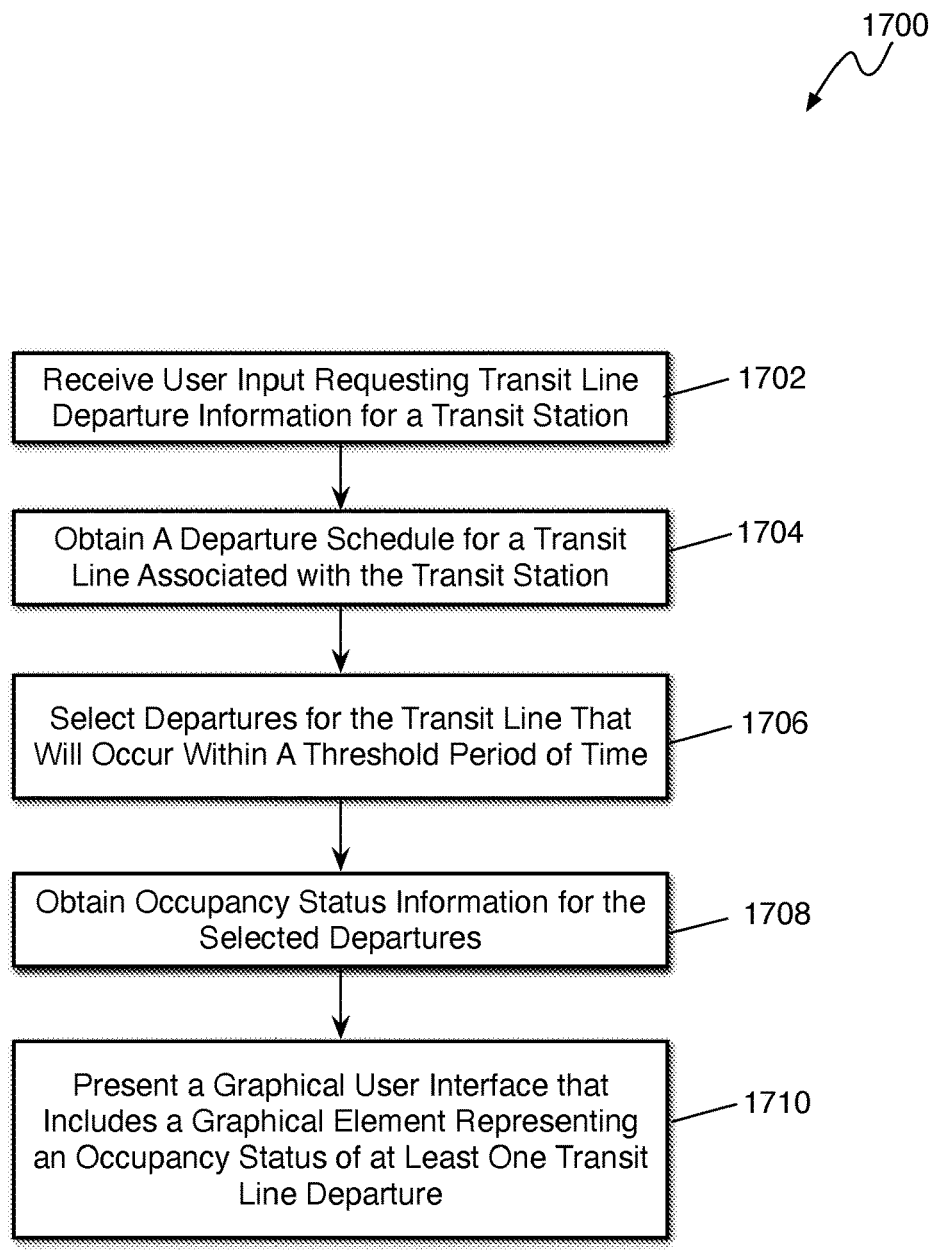
FIG. 17 is a flow diagram of an example process for presenting occupancy status for a transit departure.

FIG. 17 is a flow diagram of an example process 1700 for presenting occupancy status for a transit departure. For example, process 1700 can be performed by navigation application 104 on user device 102 to present occupancy status information for transit departures within a transit system. In some implementations, the occupancy of a transit departure (e.g., a transit vehicle on a particular transit line, leaving a particular transit station at a particular departure time) can correspond to the occupancy of a transit vehicle corresponding to the transit departure at the time when the user is viewing the transit departure occupancy information. In some implementations, the occupancy of a transit departure can correspond to the predicted occupancy of a transit vehicle corresponding to the transit departure at the time when the transit vehicle is expected to execute the departure. In some implementations, the occupancy of a transit departure can correspond to the predicted occupancy of a transit vehicle corresponding to the transit departure at the time when the transit vehicle is expected to arrive at the transit station corresponding to the departure.

At step 1702, user device 102 can receive user input requesting transit line departure information for a transit station. For example, navigation application 104 can receive user input requesting transit line departure information as part of a routing request, as part of a request for nearby transit options, and/or when a user requests any information about departures from a transit station. The transit line departure information can be requested with reference to a single transit station and/or single transit line. The transit line departure information can be requested with reference to multiple transit stations and/or multiple transit lines.

At step 1704, user device 102 can obtain a departure schedule for a transit line associated with the transit station. For example, navigation application 104 can obtain departure schedule from navigation server 112 on server device 110 for the transit line and/or transit lines identified in the user request received at step 1702. Navigation application 104 can request the departure schedule information in response to receiving the user request at step 1702. Navigation application 104 may have requested the departure schedule information prior to the user's request at step 1702. For example, navigation application 104 may cached the departure schedule information received form navigation server 112 to service subsequent user requests, such as the request received at step 1702.

At step 1706, user device 102 can select departures for the transit line that will occur within a threshold period of time. For example, when presenting real time, or near real time, transit vehicle occupancy information, navigation application 104 may select departures that will occur within short period of time (e.g., 10 minutes, 20 minutes, etc.) from the time of the departure information request. However, when presenting predicted occupancy status (e.g., based on historical occupancy data), navigation application 104 may select departures that occur within a greater period of time (e.g., 6 hours, 12 hours, 1 day, 2 days, etc.) from the time of the departure information request. In some implementations, when presenting predicted occupancy status, navigation application 104 may not limit the transit line selection to a threshold period of time. For example, navigation application 104 may present predicted occupancy status information for any departure at any time when the real time, or near real time, occupancy status information is not available for a departure.

At step 1708, user device 102 can obtain occupancy status information for the selected departures. For example, navigation application 104 can obtain real time, or near real time, departure occupancy information from transit server 132 through navigation server 112. Since transit server 132 is part of a computer system managing a transit system, transit server 132 may be configured to provide real time, or near real time, occupancy information for the vehicles operating within the corresponding transit system. In some implementations, navigation application 104 may obtain predicted occupancy status information from navigation server 112 and/or transit server 132. For example, navigation server 112 may collect historical occupancy data as transit server 132 sends real time, or near real time, occupancy data to navigation server 112 to share with navigation application 104. Navigation server can analyze the historical occupancy data to predict future departure occupancy statuses. The predicted occupancy status may be used by users to adjust the timing of their transit trips to avoid peak travel times on the various transit systems.

At step 1710, user device 102 can present a graphical user interface that includes a graphical element representing the occupancy status of at least one transit line departure. For example, navigation server 112 can present a graphical element, such as graphical elements 1112 of FIG. 11, that represents the current or predicted occupancy status of a selected transit departure. Navigation server 112 may present text describing the occupancy status represented by the occupancy graphical elements.

In some implementations, the appearance of the occupancy graphical element representing real time occupancy status may be different than the occupancy graphical element representing predicted occupancy status. For example, different colors and/or shading may be used for real time occupancy status graphical elements than the colors and/or shading used for predicted occupancy status graphical elements.

Figure 18:
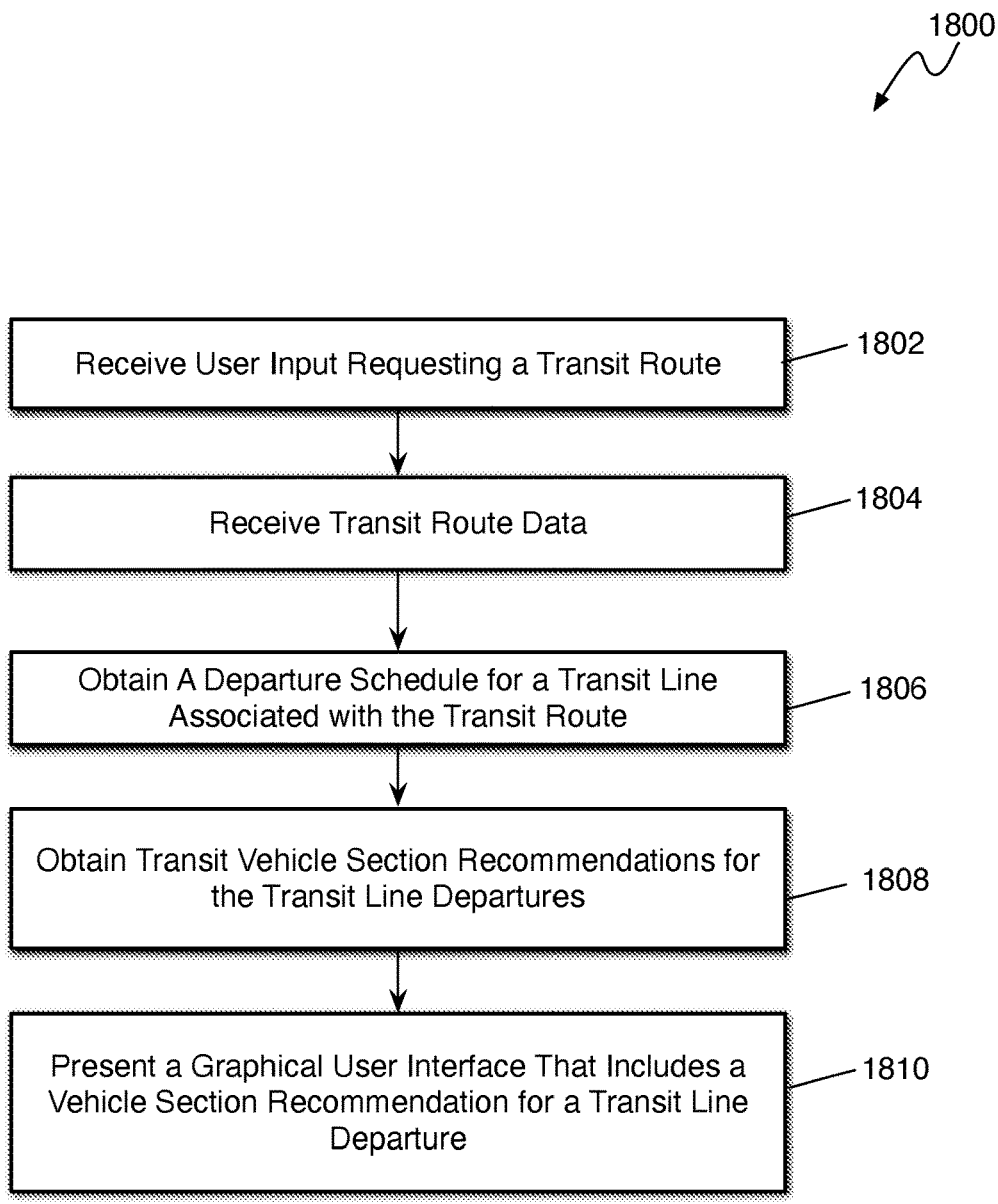
FIG. 18 is a flow diagram of an example process for presenting transit vehicle section suggestions.

FIG. 18 is a flow diagram of an example process 1800 for presenting transit vehicle section suggestions. For example, process 1800 can be performed by navigation application 104 on user device 102 to present transit vehicle section recommendations on a display of user device 102. The transit vehicle section recommendation can be presented in anticipation of a user boarding a transit vehicle and provides recommendations for transit vehicle sections to board that will provide an efficient (e.g., quickest, shortest, etc.) path to a subsequent transit vehicle or transit station exit. For example, if the user follows the transit vehicle section recommendation when boarding a transit vehicle, the user will be able to more quickly and efficiently move along the transit route.

At step 1802, user device 102 can receive user input requesting a transit route. For example, navigation application 104 can receive use input requesting a transit route. Navigation application 104 can receive user input specifying a destination location. Navigation application 104 can receive user input specifying a starting location or automatically determine the starting location based on the current location of user device 102. Navigation application 104 can send a transit route request, including the starting location and/or destination location, to navigation server 112 so that navigation server 112 can generate a transit route for the user. For example, navigation server 112 can generate the transit route in cooperation with transit server 132, as described above.

At step 1804, user device 102 can receive transit route data. For example, navigation application 104 can receive transit route data describing a transit route from the starting location to the destination location using one or more transit lines and transit stations.

At step 1806, user device 102 can obtain a departure schedule for a transit line at a transit station associated with the generated transit route. For example, navigation application 104 can obtain the departure schedule from the transit route data received at step 1804.

At step 1808, user device 102 can obtain transit vehicle section recommendations for the transit line departures. For example, navigation application 104 can obtain the transit vehicle section recommendations for each departure associated with a transit line and transit stop from the transit route data. The transit vehicle section recommendation can indicate a section of the transit vehicle servicing a transit departure that will provide an efficient (e.g., quickest, shortest, etc.) path to a subsequent transit vehicle or transit station exit along the transit route generated for the user. For example, if the user follows the transit vehicle section recommendation when boarding a transit vehicle, the user will be able to move along the transit route more quickly and efficiently.

At step 1810, user device 102 can present a graphical user interface that includes a vehicle section recommendation for a transit line departure. For example, navigation application 104 can present a graphical user interface that presents graphical elements 112 representing a vehicle section recommendation for a transit line departure and a textual description of the vehicle section recommendation, as illustrated by FIG. 11.

Figure 19:
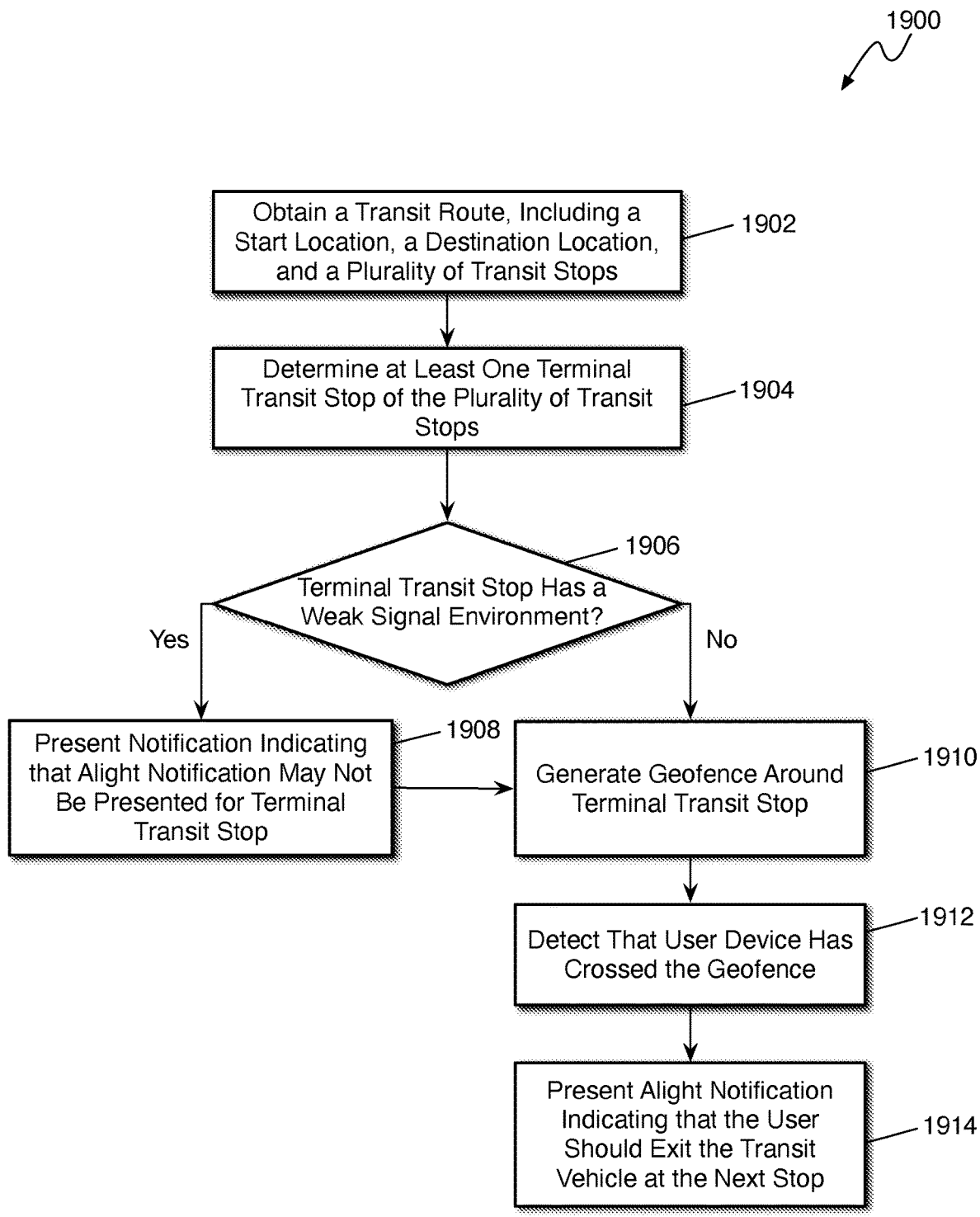
FIG. 19 is a flow diagram of an example process for presenting alight notifications.

FIG. 19 is a flow diagram of an example process 1900 for presenting alight notifications. For example, process 1900 can be performed by navigation application 104 of user device 102 to present alight notifications on a display of user device 102. Alight notifications can be presented when the user is not currently interacting with navigation application 104 to warn the user that the user will soon need to exit a transit vehicle at an upcoming transit station. The alight notification may reduce the chances that a user will miss an upcoming transit transfer or exit along the user's transit route.

At step 1902, user device 102 can obtain transit route data describing a transit route generated for a user of user device 102. The transit route data can include a start location, destination location, and a plurality of transit stops. For example, navigation application 104 can receive the transit route data from navigation server 112.

At step 1904, user device 102 can determine at least one terminal transit stop of the plurality of transit stops along the transit route generated for the user. For example, a terminal transit stop can be a transit stop where the user will need to exit a transit vehicle along the transit route to connect to another transit vehicle (e.g., on another transit line) or to travel to the destination of the transit route (e.g., by walking, driving, biking, etc.) outside of the transit system used for the transit portion of the transit route.

At step 1906, user device 102 can determine whether the determined terminal transit stop has a weak signal environment. For example, navigation application 104 can determine that the terminal transit stop has a weak signal environment based on transit stop data received in the transit route data. For example, navigation server 112 can receive crowd source signal data associated with transit stops from multiple user devices. Based on this crowd sourced signal data, navigation server 112 can determine which transit stops (e.g., transit stations) are located in weak signal environments where there are limited or weak wi-fi signals, cellular signals, satellite signals, and/or other signals used by user device 102 to determine the current location of user device 102. Navigation server 112 can include data in the transit route data identifying transit stations having weak signal environments.

At step 1908, user device 102 can present a notification indicating that an alight notification may not be presented for the terminal transit stop. For example, when navigation application 104 determines that the terminal transit stop is located within a weak signal environment, navigation application 104 can present a notification warning the user that an alight notification may not be presented and that the user should pay attention when traversing the transit system portion of the transit route, as illustrated by FIG. 14.

At step 1910, user device 102 can generate a geofence around the terminal transit stop. For example, navigation application 104 can generate a geofence around the terminal transit stop. The geofence can be configured with a radius that will allow navigation application 104 to present the alight notification in advance of the user's arrival at the terminal transit stop. For example, the geofence can be configured to cause navigation application 104 to present the alight notification a number of minutes (e.g., 5, 7, 10, etc.) in advance of the user's arrival at the terminal transit station.

At step 1912, user device 102 can detect that user device 102 has crossed into the geofence. For example, when user device 102 is not within a low signal environment, user device 102 can determine the current location of user device 102 using wi-fi signals, cellular signals, satellite signals, etc. User device 102 can monitor the current location of user device 102 as user device 102 moves along the transit route and detect when user device 102 crosses the boundary of the geofence configured for the terminal transit station.

At step 1914, user device 102 can present an alight notification indicating that the user should exit the transit vehicle at the next transit station. For example, navigation application 104 can present the alight notification illustrated by FIG. 13 in response to detecting that user device 102 has crossed into the geofence at step 1912. The alight notification can indicate that the user should exit the transit vehicle soon and/or identify the transit station where the user should exit the transit vehicle. The alight notification may reduce the chances that the user will miss exiting the transit vehicle at the correct stop along the transit route.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to improve a user's experience while traveling on public transit systems. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to present notifications, generate route recommendations, generate transit vehicle section recommendations, etc. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of transit navigation services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, transit routing information can be provided based on non-personal information data or a bare minimum amount of personal information, such as the content being requested by the device associated with a user, other non-personal information available to the transit routing services, or publicly available information.

Example System Architecture

Figure 20:
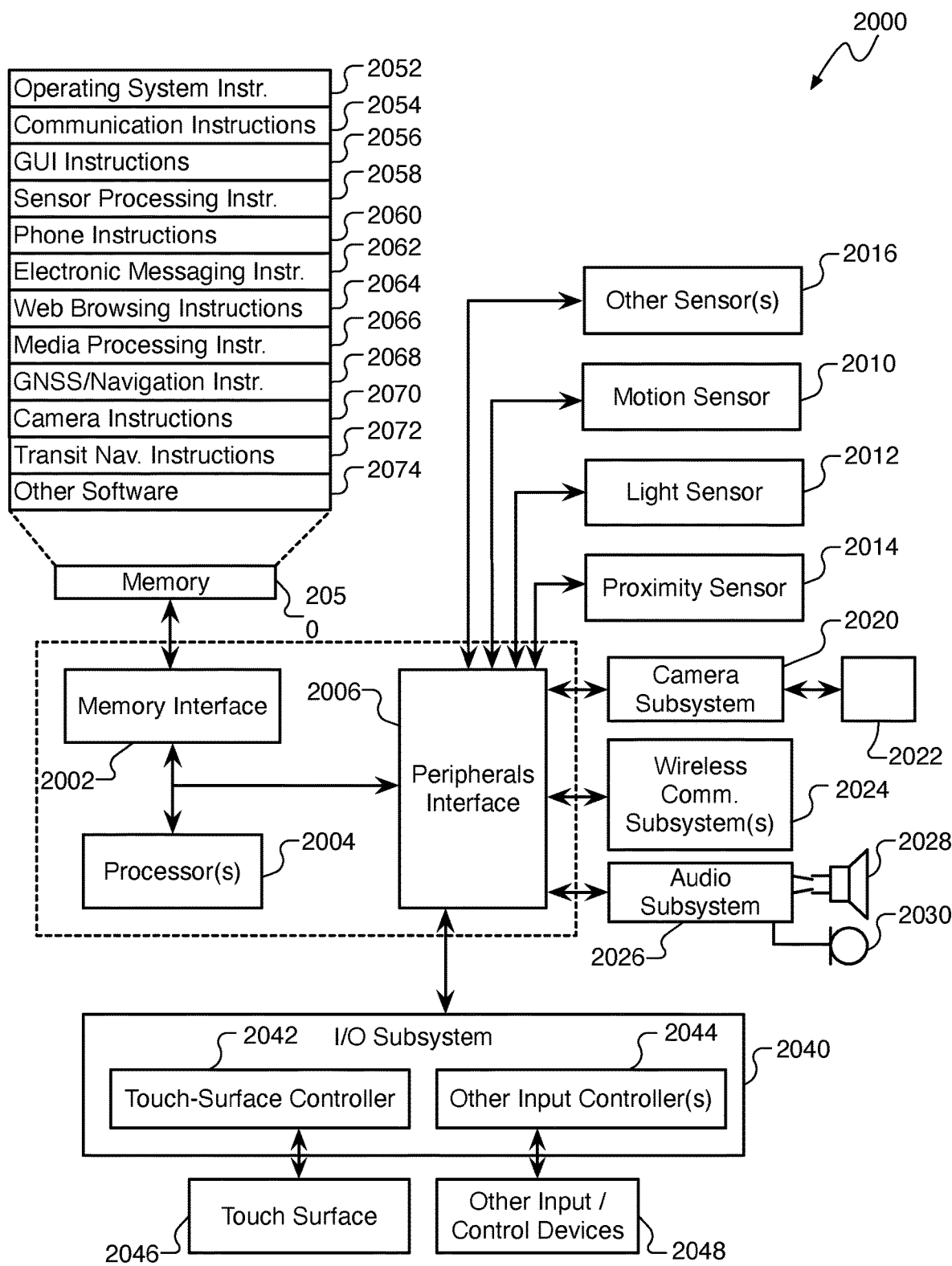
FIG. 20 is a block diagram of an example computing device that can implement the features and processes of FIGS. 1-19.

FIG. 20 is a block diagram of an example computing device 2000 that can implement the features and processes of FIGS. 1-19. The computing device 2000 can include a memory interface 2002, one or more data processors, image processors and/or central processing units 2004, and a peripherals interface 2006. The memory interface 2002, the one or more processors 2004 and/or the peripherals interface 2006 can be separate components or can be integrated in one or more integrated circuits. The various components in the computing device 2000 can be coupled by one or more communication buses or signal lines.

Sensors, devices, and subsystems can be coupled to the peripherals interface 2006 to facilitate multiple functionalities. For example, a motion sensor 2010, a light sensor 2012, and a proximity sensor 2014 can be coupled to the peripherals interface 2006 to facilitate orientation, lighting, and proximity functions. Other sensors 2016 can also be connected to the peripherals interface 2006, such as a global navigation satellite system (GNSS) (e.g., GPS receiver), a temperature sensor, a biometric sensor, magnetometer or other sensing device, to facilitate related functionalities.

A camera subsystem 2020 and an optical sensor 2022, e.g., a charged coupled device (CCD) or a complementary metal-oxide semiconductor (CMOS) optical sensor, can be utilized to facilitate camera functions, such as recording photographs and video clips. The camera subsystem 2020 and the optical sensor 2022 can be used to collect images of a user to be used during authentication of a user, e.g., by performing facial recognition analysis.

Communication functions can be facilitated through one or more wireless communication subsystems 2024, which can include radio frequency receivers and transmitters and/or optical (e.g., infrared) receivers and transmitters. The specific design and implementation of the communication subsystem 2024 can depend on the communication network (s) over which the computing device 2000 is intended to operate. For example, the computing device 2000 can include communication subsystems 2024 designed to operate over a GSM network, a GPRS network, an EDGE network, a Wi-Fi or WiMax network, and a Bluetooth™ network. In particular, the wireless communication subsystems 2024 can include hosting protocols such that the device 100 can be configured as a base station for other wireless devices.

An audio subsystem 2026 can be coupled to a speaker 2028 and a microphone 2030 to facilitate voice-enabled functions, such as speaker recognition, voice replication, digital recording, and telephony functions. The audio subsystem 2026 can be configured to facilitate processing voice commands, voiceprinting and voice authentication, for example.

The I/O subsystem 2040 can include a touch-surface controller 2042 and/or other input controller(s) 2044. The touch-surface controller 2042 can be coupled to a touch surface 2046. The touch surface 2046 and touch-surface controller 2042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 2046.

The other input controller(s) 2044 can be coupled to other input/control devices 2048, such as one or more buttons, rocker switches, thumb-wheel, infrared port, USB port, and/or a pointer device such as a stylus. The one or more buttons (not shown) can include an up/down button for volume control of the speaker 2028 and/or the microphone 2030.

In one implementation, a pressing of the button for a first duration can disengage a lock of the touch surface 2046; and a pressing of the button for a second duration that is longer than the first duration can turn power to the computing device 2000 on or off. Pressing the button for a third duration can activate a voice control, or voice command, module that enables the user to speak commands into the microphone 2030 to cause the device to execute the spoken command. The user can customize a functionality of one or more of the buttons. The touch surface 2046 can, for example, also be used to implement virtual or soft buttons and/or a keyboard.

In some implementations, the computing device 2000 can present recorded audio and/or video files, such as MP3, AAC, and MPEG files. In some implementations, the computing device 2000 can include the functionality of an MP3 player, such as an iPod™.

The memory interface 2002 can be coupled to memory 2050. The memory 2050 can include high-speed random-access memory and/or non-volatile memory, such as one or more magnetic disk storage devices, one or more optical storage devices, and/or flash memory (e.g., NAND, NOR). The memory 2050 can store an operating system 2052, such as Darwin, RTXC, LINUX, UNIX, OS X, WINDOWS, or an embedded operating system such as VxWorks.

The operating system 2052 can include instructions for handling basic system services and for performing hardware dependent tasks. In some implementations, the operating system 2052 can be a kernel (e.g., UNIX kernel). In some implementations, the operating system 2052 can include instructions for performing public transit navigation. For example, operating system 2052 can implement the public transit navigation features as described with reference to FIGS. 1-19.

The memory 2050 can also store communication instructions 2054 to facilitate communicating with one or more additional devices, one or more computers and/or one or more servers. The memory 2050 can include graphical user interface instructions 2056 to facilitate graphic user interface processing; sensor processing instructions 2058 to facilitate sensor-related processing and functions; phone instructions 2060 to facilitate phone-related processes and functions; electronic messaging instructions 2062 to facilitate electronic-messaging related processes and functions; web browsing instructions 2064 to facilitate web browsing-related processes and functions; media processing instructions 2066 to facilitate media processing-related processes and functions; GNSS/Navigation instructions 2068 to facilitate GNSS and navigation-related processes and instructions; and/or camera instructions 2070 to facilitate camera-related processes and functions.

The memory 2050 can store software instructions 2072 to facilitate other processes and functions, such as the public transit navigation processes and functions as described with reference to FIGS. 1-19.

The memory 2050 can also store other software instructions 2074, such as web video instructions to facilitate web video-related processes and functions; and/or web shopping instructions to facilitate web shopping-related processes and functions. In some implementations, the media processing instructions 2066 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 2050 can include additional instructions or fewer instructions. Furthermore, various functions of the computing device 2000 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A method comprising:
obtaining, by a navigation application executing on a computing device, a transit route from a start location to a destination location, the transit route including a plurality of transit stops along the transit route;
determining, by the navigation application, a first transit stop included in the transit route corresponding to a first exit from a first transit vehicle;
determining, by the navigation application, that the first transit stop is in a low signal environment corresponding to a geofence;
presenting, by the navigation application, a navigation presentation of the transit route from the start location to the destination location; and
while presenting the navigation presentation, and responsive to determining (a) that the first transit stop is in the low signal environment corresponding to the geofence, and (b) that the computing device has entered the geofence and/or is within a threshold distance from the first transit stop: presenting, by the navigation application, a first notification warning that the first transit stop is in the low signal environment and that the computing device may not present any notification on the display of the computing device indicating that the user should exit the first transit vehicle at the first transit stop.

2. The method of claim 1, further comprising:
determining, by the computing device, a second transit stop included in the transit route corresponding to a second exit from a second transit vehicle;
generating, by the computing device, a second geofence around the second transit stop;
detecting, by the computing device, that the computing device has entered the second geofence; and
presenting, by the computing device, a second notification on a display of the computing device indicating that a user of the computing device should exit the second transit vehicle at the second transit stop.

3. The method of claim 2, wherein the first exit from the first transit vehicle corresponds to a transit vehicle transfer.

4. The method of claim 2, wherein the second exit from the second transit vehicle corresponds to an exit from a transit station.

5. The method of claim 2, further comprising:
determining, by the computing device, that the navigation application is running as a background process on the computing device; and
in response to determining that the navigation application is running as a background process, presenting, by the computing device, a second notification on the display of the computing device when the computing device enters the second geofence.

6. The method of claim 1, further comprising:
determining, by the computing device, a second transit stop included in the transit route corresponding to a second exit from a second transit vehicle;
generating, by the computing device, a second geofence around the second transit stop;
detecting, by the computing device, that the computing device has entered the second geofence;
determining, by the computing device, that the navigation application is running as a foreground process on the computing device; and
in response to determining that the navigation application is running as a foreground process, refraining, by the computing device, from presenting a second notification on a display of the computing device indicating that a user of the computing device should exit the second transit vehicle at the second transit stop when the computing device has entered the second geofence.

7. A non-transitory computer readable medium including one or more sequences of instructions that, when executed by one or more processors, cause the processors to perform operations comprising:
obtaining, by a navigation application executing on a computing device, a transit route from a start location to a destination location, the transit route including a plurality of transit stops along the transit route;
determining, by the navigation application, a first transit stop included in the transit route corresponding to a first exit from a first transit vehicle;
determining, by the navigation application, that the first transit stop is in a low signal environment corresponding to a geofence;
presenting, by the navigation application, a navigation presentation of the transit route from the start location to the destination location; and
while presenting the navigation presentation, and responsive to determining (a) that the first transit stop is in the low signal environment corresponding to the geofence, and (b) that the computing device has entered the geofence and/or is within a threshold distance from the first transit stop: presenting, by the navigation application, a first notification warning that the first transit stop is in the low signal environment and that the computing device may not present any notification on the display of the computing device indicating that the user should exit the first transit vehicle at the first transit stop.

8. The non-transitory computer readable medium of claim 7, wherein the instructions cause the processors to perform operations comprising:
determining, by the computing device, a second transit stop included in the transit route corresponding to a second exit from a second transit vehicle;
generating, by the computing device, a second geofence around the second transit stop;
detecting, by the computing device, that the computing device has entered the second geofence; and
presenting, by the computing device, a second notification on a display of the computing device indicating that a user of the computing device should exit the second transit vehicle at the second transit stop.

9. The non-transitory computer readable medium of claim 8, wherein the first exit from the first transit vehicle corresponds to a transit vehicle transfer.

10. The non-transitory computer readable medium of claim 8, wherein the second exit from the second transit vehicle corresponds to an exit from a transit station.

11. The non-transitory computer readable medium of claim 8, wherein the instructions cause the processors to perform operations comprising:
determining, by the computing device, that the navigation application is running as a background process on the computing device; and
in response to determining that the navigation application is running as a background process, presenting, by the computing device, a third notification on the display of the computing device when the computing device enters the second geofence.

12. The non-transitory computer readable medium of claim 7, wherein the instructions cause the processors to perform operations comprising:
determining, by the computing device, a second transit stop included in the transit route corresponding to a second exit from a second transit vehicle;
generating, by the computing device, a second geofence around the second transit stop;
detecting, by the computing device, that the computing device has entered the second geofence;
determining, by the computing device, that the navigation application is running as a foreground process on the computing device; and
in response to determining that the navigation application is running as a foreground process, refraining, by the computing device, from presenting a second notification on a display of the computing device indicating that a user of the computing device should exit the second transit vehicle at the second transit stop when the computing device has entered the second geofence.

13. A computing device comprising:
one or more processors; and
a non-transitory computer readable medium including one or more sequences of instructions that, when executed by the one or more processors, cause the processors to perform operations comprising:
obtaining, by a navigation application executing on the computing device, a transit route from a start location to a destination location, the transit route including a plurality of transit stops along the transit route;
determining, by the navigation application, a first transit stop included in the transit route corresponding to a first exit from a first transit vehicle;
determining, by the navigation application, that the first transit stop is in a low signal environment corresponding to a geofence;
presenting, by the navigation application, a navigation presentation of the transit route from the start location to the destination location; and
while presenting the navigation presentation, and responsive to determining (a) that the first transit stop is in the low signal environment corresponding to the geofence, and (b) that the computing device has entered the geofence and/or is within a threshold distance from the first transit stop: presenting, by the navigation application, a first notification warning that the first transit stop is in the low signal environment and that the computing device may not present any notification on the display of the computing device indicating that the user should exit the first transit vehicle at the first transit stop.

14. The computing device of claim 13, wherein the instructions cause the processors to perform operations comprising:
determining, by the computing device, a second transit stop included in the transit route corresponding to a second exit from a second transit vehicle;
generating, by the computing device, a second geofence around the second transit stop;
detecting, by the computing device, that the computing device has entered the second geofence; and
presenting, by the computing device, a second notification on a display of the computing device indicating that a user of the computing device should exit the second transit vehicle at the second transit stop.

15. The computing device of claim 14, wherein the first exit from the first transit vehicle corresponds to a transit vehicle transfer.

16. The computing device of claim 14, wherein the second exit from the second transit vehicle corresponds to an exit from a transit station.

17. The computing device of claim 14, wherein the instructions cause the processors to perform operations comprising:
determining, by the computing device, that the navigation application is running as a background process on the computing device; and
in response to determining that the navigation application is running as a background process, presenting, by the computing device, a second notification on the display of the computing device when the computing device enters the second geofence.

18. The computing device of claim 13, wherein the instructions cause the processors to perform operations comprising:
determining, by the computing device, a second transit stop included in the transit route corresponding to a second exit from a second transit vehicle;
generating, by the computing device, a second geofence around the second transit stop;
detecting, by the computing device, that the computing device has entered the second geofence;
determining, by the computing device, that the navigation application is running as a foreground process on the computing device; and
in response to determining that the navigation application is running as a foreground process, refraining, by the computing device, from presenting a second notification on a display of the computing device indicating that a user of the computing device should exit the second transit vehicle at the second transit stop when the computing device has entered the second geofence.

* * * * *